US012135696B2

(12) United States Patent
Sheela et al.

(10) Patent No.: US 12,135,696 B2
(45) Date of Patent: *Nov. 5, 2024

(54) DYNAMIC MULTI-PLATFORM MODEL GENERATION AND DEPLOYMENT SYSTEM

(71) Applicant: Bank of America Corporation, Charlotte, NC (US)

(72) Inventors: Uma Sheela, Plano, TX (US); Partha Sarathi Dhar, Chester Springs, PA (US); Michael Fleischer, Double Oak, TX (US); Jeff Hogue, Frisco, TX (US); Joyce Ashley, Westlake Village, CA (US); Manivannan Perumalswami, Frisco, TX (US); Huy Tran, Hockessin, DE (US); Valerie Cozart, Mesa, AZ (US); Adam Jones, Landenberg, PA (US); Marcey Donnelly, Pleasanton, CA (US); Rose Brunner, Richmond, VA (US); Mark Wheelwright, Herriman, UT (US); Benjamin Porter, Charlotte, NC (US); Scott Beavers, Lincoln University, PA (US); Swarn Deep, New Delhi (IN); Shashank Kumar Bajpai, Uttar Pradesh (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,503

(22) Filed: Sep. 1, 2023

(65) Prior Publication Data

US 2023/0409543 A1 Dec. 21, 2023

Related U.S. Application Data

(63) Continuation of application No. 17/477,054, filed on Sep. 16, 2021, now Pat. No. 11,782,888.

(51) Int. Cl.
*G06F 16/21* (2019.01)
*G06F 16/23* (2019.01)

(52) U.S. Cl.
CPC ............ *G06F 16/212* (2019.01); *G06F 16/23* (2019.01)

(58) Field of Classification Search
CPC ........ G06F 16/212; G06F 16/23; G06F 16/27; G06F 16/9038
See application file for complete search history.

(56) References Cited

U.S. PATENT DOCUMENTS 7,814,142 B2 10/2010 Mamou et al.
8,566,185 B2 10/2013 Bartelt et al.
(Continued)

*Primary Examiner* — Mariela Reyes
*Assistant Examiner* — Fatima P Mina
(74) *Attorney, Agent, or Firm* — Banner & Witcoff, Ltd.

(57) ABSTRACT

Aspects of the disclosure relate to dynamic model configuration and execution. A computing platform may receive first model data comprising first model execution configuration data and first model output configuration data. The computing platform may generate a first model based on the first model execution configuration data. The computing platform may distribute, to a plurality of computing platforms, the first model, the first model execution configuration data, and the first model output configuration data. The computing platform may receive a second request to execute one or more models from a third computing platform. The computing platform may receive, from the third computing platform, first model execution data. The computing platform may execute the first model based on the first model execution data and the first model execution configuration data to generate a first model output score.

20 Claims, 17 Drawing Sheets

(56) References Cited

U.S. PATENT DOCUMENTS

| | | | |
|---|---|---|---|
| 8,924,269 | B1 | 12/2014 | Seubert et al. |
| 9,063,765 | B2 | 6/2015 | Fallows |
| 9,411,864 | B2 | 8/2016 | Glider et al. |
| 10,275,227 | B1* | 4/2019 | Vompolu ............. G06F 11/3688 |
| 10,324,695 | B2 | 6/2019 | Champagne |
| 10,489,430 | B1* | 11/2019 | Rogynskyy ......... G06F 16/2264 |
| 11,082,373 | B1 | 8/2021 | Kochhar et al. |
| 11,157,259 | B1* | 10/2021 | Lin ..................... G06F 9/45512 |
| 2015/0142649 | A1 | 5/2015 | Rathod |
| 2017/0115964 | A1* | 4/2017 | Vadapandeshwara ....................... G06F 9/45508 |
| 2020/0401491 | A1 | 12/2020 | Mohamed et al. |
| 2021/0081706 | A1 | 3/2021 | Kiang et al. |
| 2022/0237449 | A1* | 7/2022 | Chung .................. G06F 18/214 |

* cited by examiner

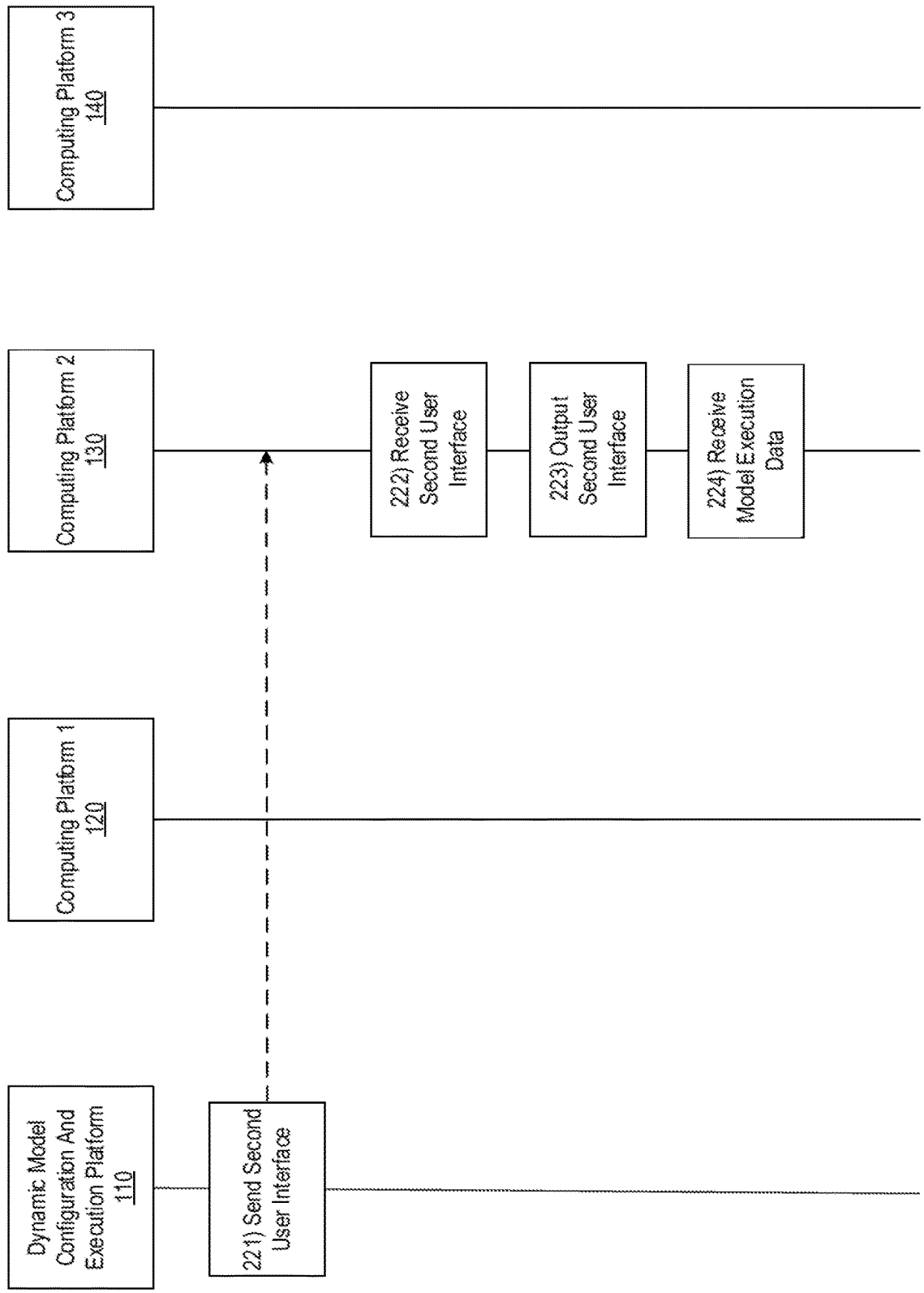

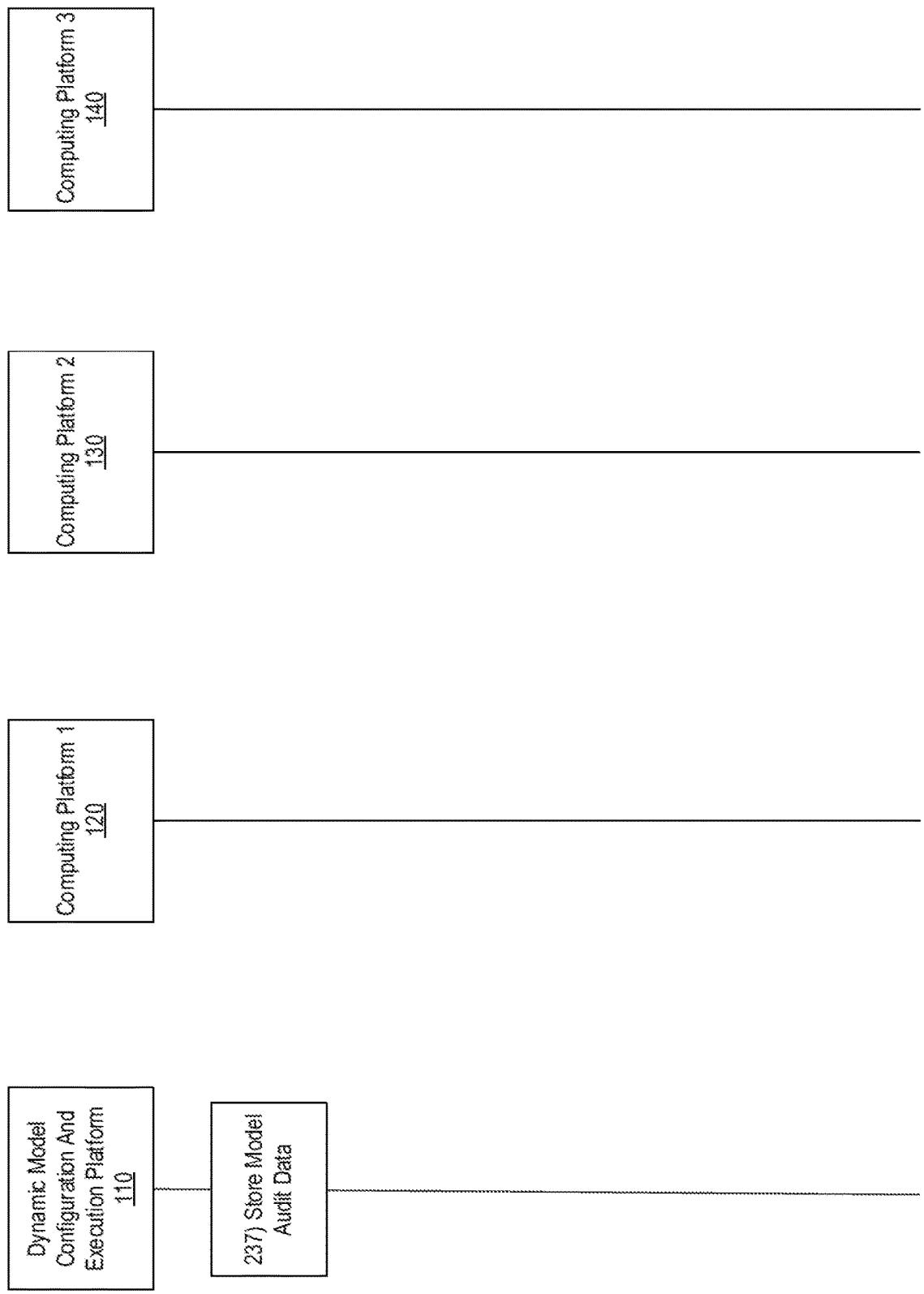

DYNAMIC MULTI-PLATFORM MODEL GENERATION AND DEPLOYMENT SYSTEM

CROSS-REFERENCE TO RELATED APPLICATIONS

This application is a continuation of and claims priority to co-pending U.S. application Ser. No. 17/477,054 filed Sep. 16, 2021, entitled "Dynamic Multi-Platform Model Generation and Deployment System," which is incorporated herein by reference in its entirety.

BACKGROUND

Aspects of the disclosure relate to dynamic configuration and execution of models within a standardized modeling platform. In particular, one or more aspects of the disclosure relate to dynamically generating and configuring standardized models that may be deployed for execution across different computing platforms that implement different programming platforms.

In some cases, enterprise organizations may execute models on a plurality of different computing platforms. Because these different computing platforms often execute the model within different programming platforms, specialized models have to be developed for each different computing platform. Moreover, each of the specialized models must be separately updated anytime a change to a model is desired. This process is costly, time-consuming, and error-prone. Further, minor inconsistencies among the specialized models resulting from the different nuances of the different programming platforms may lead to inconsistent outputs across the specialized models. To improve the execution of models across different computing platforms that implement different programming platforms, there is a need for a platform that dynamically generates and configures standardized models for deployment and execution on these different computing platforms.

SUMMARY

Aspects of the disclosure provide effective, efficient, scalable, and convenient technical solutions that address and overcome the technical problems associated with conventional model deployment and execution across different computing platforms. In accordance with one or more embodiments of the disclosure, a computing platform comprising at least one processor, a communication interface, and memory storing computer-readable instructions may receive a request to generate a model from a second computing platform. The computing platform may generate a graphical user interface in response to receiving the request to generate a model. The computing platform may send the graphical user interface to the second computing platform, wherein sending the graphical user interface to the second computing platform may be configured to cause the second computing platform to output the graphical user interface for display to a display device of the second computing platform. The computing platform may receive, from the second computing platform, first model data comprising first model execution configuration data and first model output configuration data. The computing platform may generate, based on the first model execution configuration data, a first model. The computing platform may distribute, to a plurality of computing platforms, the first model, the first model execution configuration data, and the first model output configuration data. The computing platform may receive a second request to execute one or more models from a third computing platform. The computing platform may generate, in response to receiving the second request to execute the one or more models, a second graphical user interface. The computing platform may send the second graphical user interface to the third computing platform, wherein sending the second graphical user interface to the third computing platform may be configured to cause the third computing platform to output the second graphical user interface for display to a display device of the third computing platform. The computing platform may receive, from the third computing platform, first model execution data. The computing platform may execute the first model based on the first model execution data and the first model execution configuration data to generate a first model output score.

In one or more instances, the computing platform may generate, based on the first model output configuration data and the first model output score, initial output data. In one or more instances, the computing platform may generate, based on the first model output configuration data and the initial output data, final output data. In one or more instances, the computing platform may generate a third graphical user interface comprising the final output data. In one or more instances, the computing platform may send the third graphical user interface to the third computing platform, wherein sending the third graphical user interface to the third computing platform may be configured to cause the third computing platform to output the third graphical user interface for display to the display device of the third computing platform.

In one or more instances, executing the first model based on the first model execution data and the first model execution configuration data may comprise determining that a first model execution dataset of the first model execution data identifies the first model and a first user, retrieving the first model and the first model execution configuration data, and retrieving user-specific values for the first user for one or more parameters listed in the first model execution configuration data. In one or more instances, executing the first model based on the first model execution data and the first model execution configuration data may further comprise weighting each of the user-specific values based on weights specified in the first model execution configuration data.

In one or more instances, the computing platform may determine that a second model execution dataset of the first model execution data identifies a second model. In one or more instances, the computing platform may retrieve the second model and a second model execution configuration data associated with the second model. In one or more instances, the computing platform may execute the second model based on the second model execution configuration data.

In one or more instances, the computing platform may receive an updated model execution configuration data for the first model execution configuration data. In one or more instances, the computing platform may update the first model execution configuration data based on the updated model execution configuration data to generate a first updated model execution configuration data. In one or more instances, the computing platform may distribute the updated first model execution configuration data to the plurality of computing platforms.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2J depict an illustrative event sequence for implementing a dynamic model configuration and execution platform in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to a dynamic multi-platform model generation and deployment system that includes a dynamic model configuration and execution platform and a plurality of different computing platforms. An enterprise may generate and execute thousands of models across many different computing platforms that implement different programming platforms. In order to execute a particular model on a plurality of different computing platforms, the enterprise may have to generate specialized models corresponding to the particular model for each of the different computing platforms based on the programming platform used by each different computing platform. Generation of these specialized models is expensive and time-consuming, and any updates to the particular model must then be propagated (and translated) for each of the specialized models corresponding to the particular model. Moreover, the translations performed to generate each of the specialized models from the particular model may result in inconsistencies among the specialized models. These inconsistencies may lead to different outputs being produced by the specialized models for the same inputs.

To improve the accuracy, cost-efficiency, and time-efficiency of the deployment and execution of a particular model across different computing platforms, an enterprise may implement a dynamic model configuration and execution platform. Specifically, the dynamic model configuration and execution platform may generate and configure a standardized model. The standardized model may be deployed and executed on different computing platforms (including, but not limited to, the dynamic model configuration and execution platform). Various configuration files may be used to configure and execute the standardized model. If there is a need to update the standardized model, such an update can be efficiently performed using these configuration files.

Figure 1A:
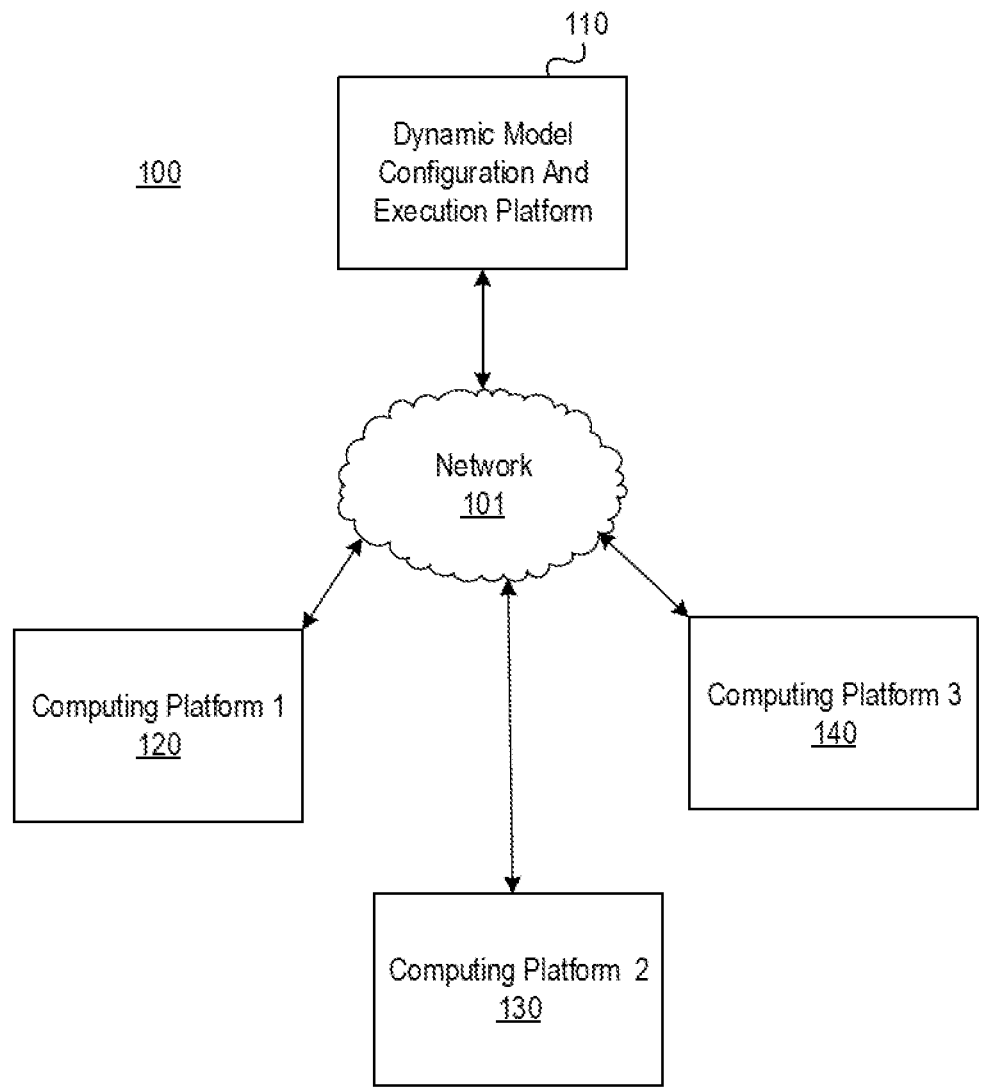
FIGS. 1A-1B depict an illustrative computing environment for implementing a dynamic model configuration and execution platform in accordance with one or more example embodiments.
Figure 1B:
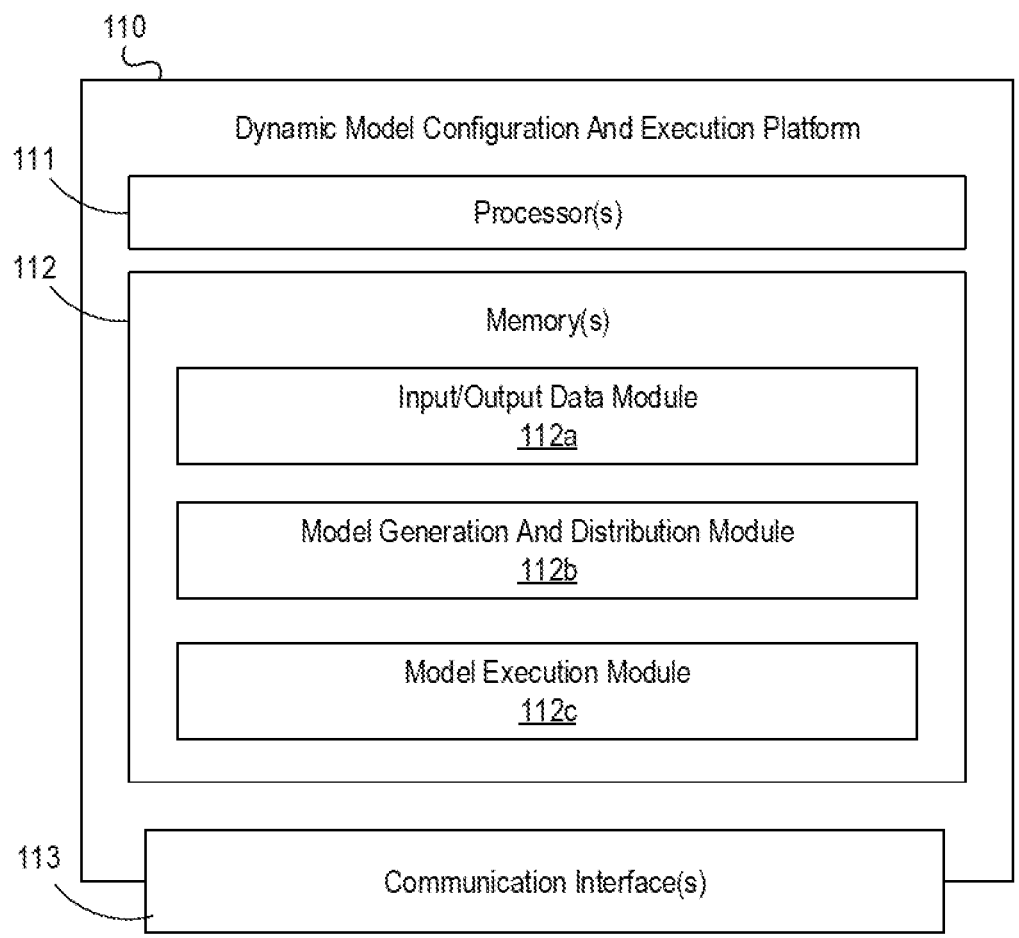

FIGS. 1A-1B depict an illustrative computing environment that implements a dynamic model configuration and execution platform in accordance with one or more arrangements described herein. Referring to FIG. 1A, computing environment 100 may include one or more computer systems. For example, computing environment 100 may include a dynamic model configuration and execution platform 110, computing platform 120, computing platform 130, and computing platform 140.

As described further below, dynamic model configuration and execution platform 110 may be a computer system that includes one or more computing devices (e.g., servers, server blades, or the like) and/or other computer components (e.g., processors, memories, communication interfaces) that may be used to generate, configure, and/or execute one or more models using one or more configuration files. In some instances, dynamic model configuration and execution platform 110 may be controlled or otherwise maintained by an enterprise organization such as a financial institution.

Computing platform 120 may be a computer system that includes one or more computing devices (e.g., servers, server blades, laptop computers, desktop computers, mobile devices, tablets, smart phones, credit card readers, or the like) and/or other computer components (e.g., processors, memories, communication interfaces) that may be used to perform enterprise operations and/or data processing. In one or more instances, computing platform 120 may be configured to communicate with dynamic model configuration and execution platform 110 for model generation, configuration, and/or execution. Computing platform 130 and computing platform 140 may be computing platforms similar to computing platform 120.

Computing environment 100 also may include one or more networks, which may interconnect dynamic model configuration and execution platform 110, computing platform 120, computing platform 130, and computing platform 140. For example, computing environment 100 may include a network 101 (which may interconnect, e.g., dynamic model configuration and execution platform 110, computing platform 120, computing platform 130, and computing platform 140).

In one or more arrangements, dynamic model configuration and execution platform 110, computing platform 120, computing platform 130, and computing platform 140, may be any type of computing device capable of sending and/or receiving requests and processing the requests accordingly. For example, dynamic model configuration and execution platform 110, computing platform 120, computing platform 130, and computing platform 140, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of dynamic model configuration and execution platform 110, computing platform 120, computing platform 130, and computing platform 140, may, in some instances, be special-purpose computing devices configured to perform specific functions.

Referring to FIG. 1B, dynamic model configuration and execution platform 110 may include one or more processors 111, memory 112, and communication interface 113. A data bus may interconnect processor 111, memory 112, and communication interface 113. Communication interface 113 may be a network interface configured to support communication between dynamic model configuration and execution platform 110 and one or more networks (e.g., network 101, or the like). Memory 112 may include one or more program modules having instructions that when executed by processor 111 cause dynamic model configuration and execution platform 110 to perform one or more functions described herein and/or one or more databases that may store and/or otherwise maintain information which may be used by such program modules and/or processor 111. In some instances, the one or more program modules and/or databases may be stored by and/or maintained in different memory units of dynamic model configuration and execution platform 110 and/or by different computing devices that may form and/or otherwise make up dynamic model configuration and execution platform 110. For example, memory 112 may have, host, store, and/or include input/output data module 112*a*, model generation and distribution module 112*b*, and model execution module 112*c*.

Input/Output data module 112*a* may have instructions that direct and/or cause dynamic model configuration and execution platform 110 to receive input data from any of the computing platforms shown in FIG. 1A (i.e., computing platform 120, computing platform 130, and computing platform 140), and/or to output data to any of the computing platforms shown in FIG. 1A (i.e., computing platform 120, computing platform 130, and computing platform 140). Model generation and distribution module 112*b* may analyze model generation data received by input/output data module 112*a* and generate one or more models for distribution and/or execution. The generated models may be distributed to any of the computing platforms shown in FIG. 1A (i.e., computing platform 120, computing platform 130, and computing platform 140) via input/output data module 112*a* and/or model generation and distribution module 112*b* for configuration and execution. Model execution module 112*c* may configure and execute one or more models generated by the model generation and distribution module 112*b*.

Figure 2A:
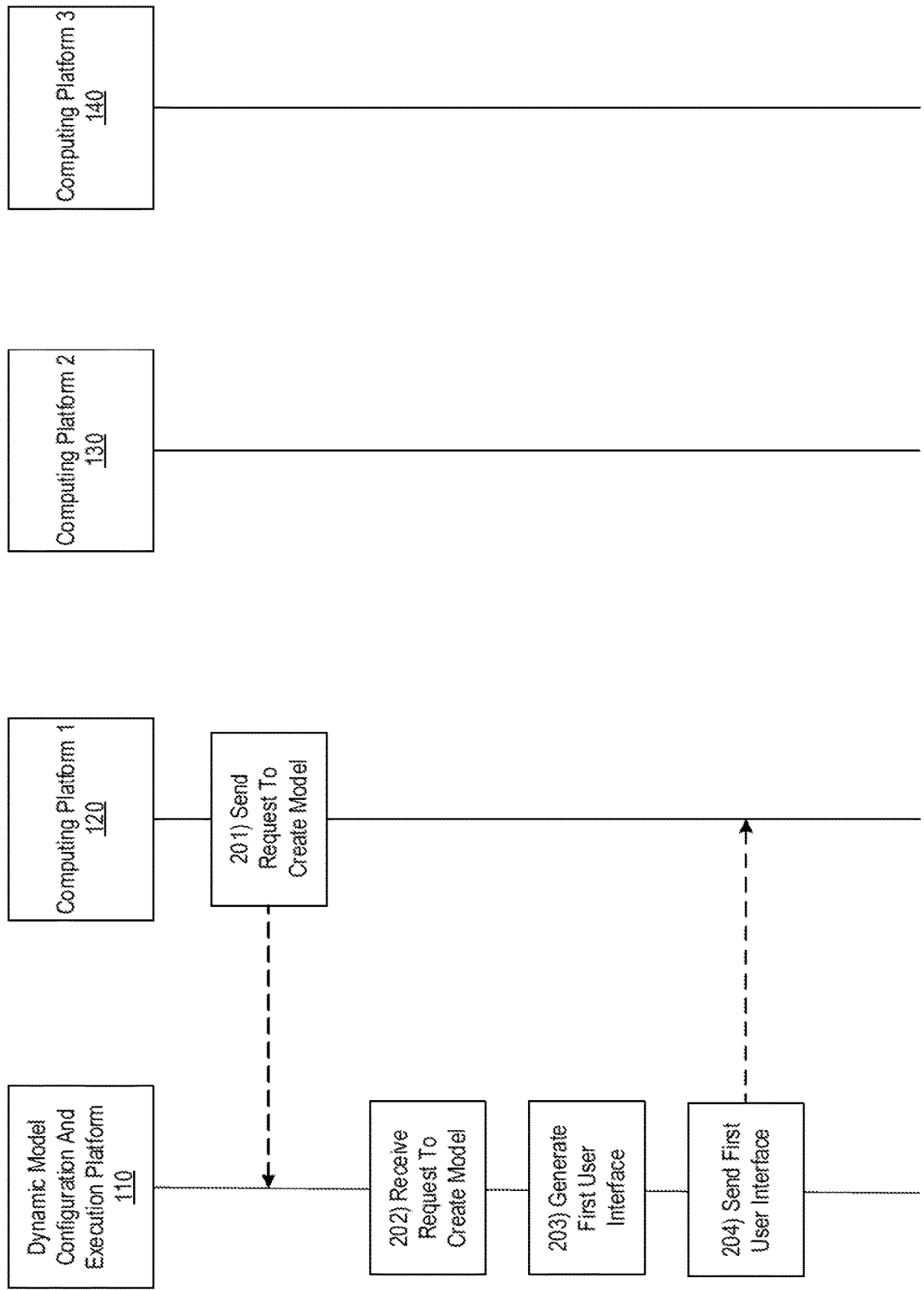
Figure 2B:
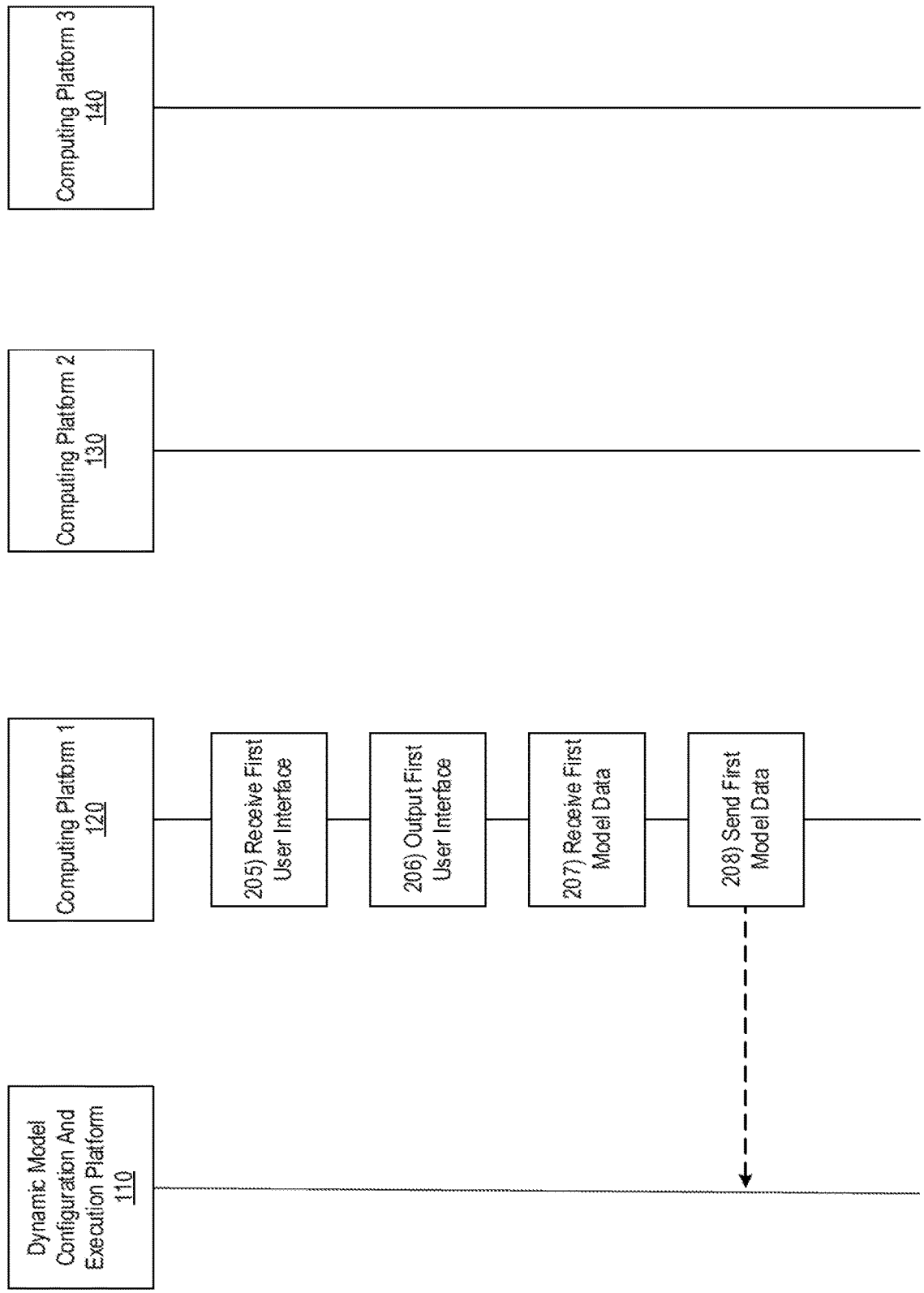

FIGS. 2A-2J depict an illustrative event sequence for implementing a dynamic model configuration and execution platform in accordance with one or more example embodiments. Referring to FIG. 2A, at step 201, computing platform 120 may send a request to create a model to dynamic model configuration and execution platform 110. Computing platform 120 may send the request to create the model to dynamic model configuration and execution platform 110 in response to receiving a user request at computing platform 120 to create the model. At step 202, dynamic model configuration and execution platform 110 may receive the request to create the model from computing platform 120. In response to receiving the request to create the model from computing platform 120 at step 202, dynamic model configuration and execution platform 110 may generate, at step 203, a first graphical user interface.

Figure 3A:
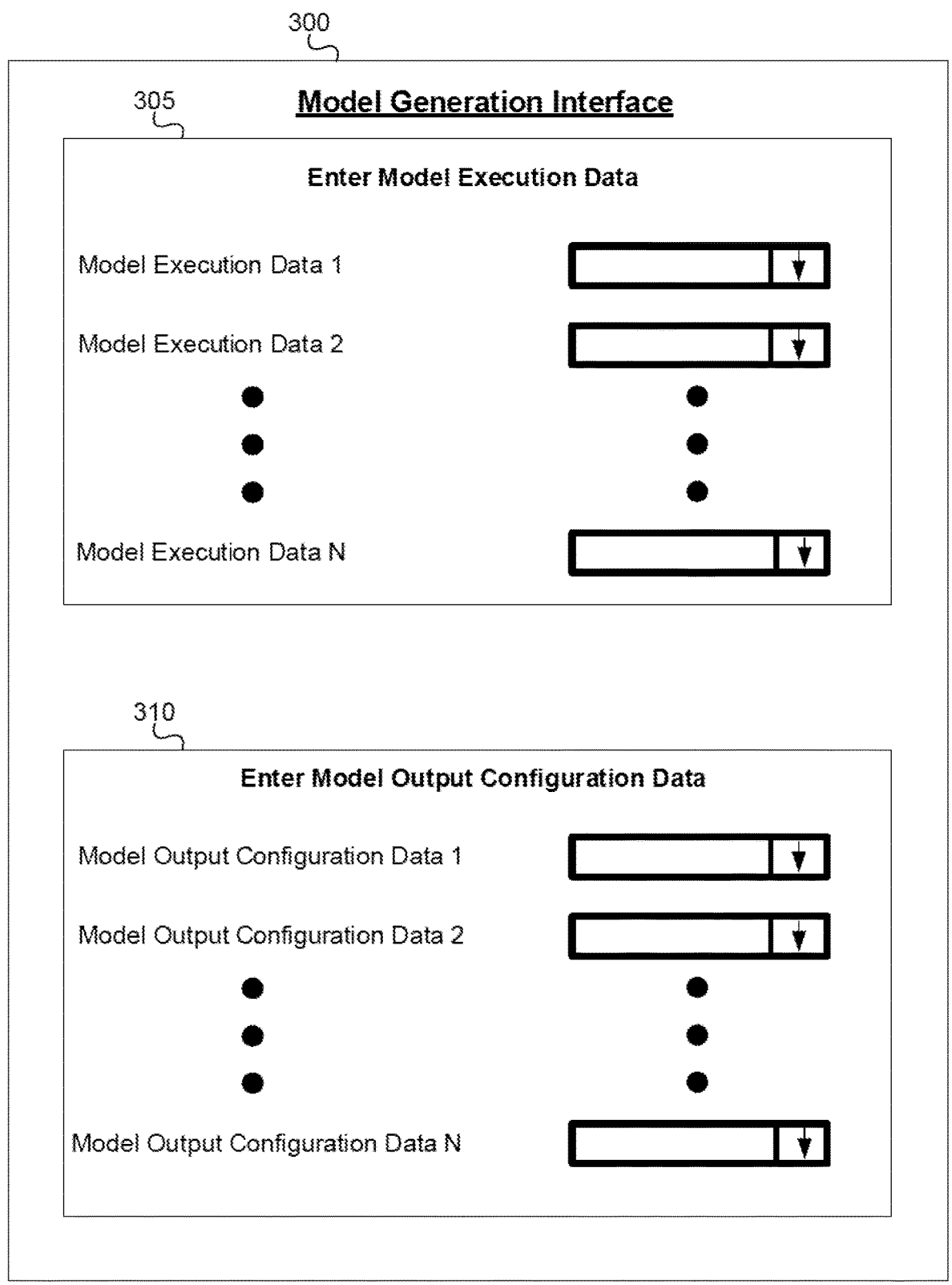
FIGS. 3A-3C depict illustrative graphical user interfaces that implement a dynamic model configuration and execution platform in accordance with one or more example embodiments.

FIG. 3A illustrates an example first graphical user interface 300 that may be generated by dynamic model configuration and execution platform 110 at step 203 and presented to the user in response to a user request to create a model. The first graphical user interface 300 may include sections 305 and 310. Section 305 of first graphical user interface 300 may include one or more data fields for receiving model execution configuration data. The model execution configuration data may include one or more configuration parameters for the model, one or more configuration files comprising one or more configuration parameters for the model, and/or the like. Section 310 of first graphical user interface 300 may include one or more data fields for receiving model output configuration data. The model output configuration data may include configuration parameters for generating output data for the user based on the execution of the model, one or more configuration files comprising one or more configuration parameters for generating output data for the user based on the execution of the model, and/or the like.

Referring back to FIG. 2A, at step 204, dynamic model configuration and execution platform 110 may send the first graphical user interface 300 generated by dynamic model configuration and execution platform 110 at step 203 to computing platform 120. The sending of the first graphical user interface 300 by dynamic model configuration and execution platform 110 to computing platform 120 may cause and/or be configured to cause computing platform 120 to output the first graphical user interface 300 for display to a user. Specifically, referring to FIG. 2B, at step 205, computing platform 120 may receive the first graphical user interface 300 from dynamic model configuration and execution platform 110. At step 206, computing platform 120 may output the first graphical user interface 300 received by computing platform 120 from dynamic model configuration and execution platform 110 to a display device of computing platform 120.

At step 207, in response to outputting the first graphical user interface 300 to the display device, computing platform 120 may receive first model configuration data via the first graphical user interface 300. The first model configuration data may include the model execution configuration data and the model output configuration data discussed above with reference to FIG. 3A. At step 208, computing platform 120 may send the first model configuration data (e.g., the model execution configuration data and the model output configuration data) to dynamic model configuration and execution platform 110.

Figure 2C:
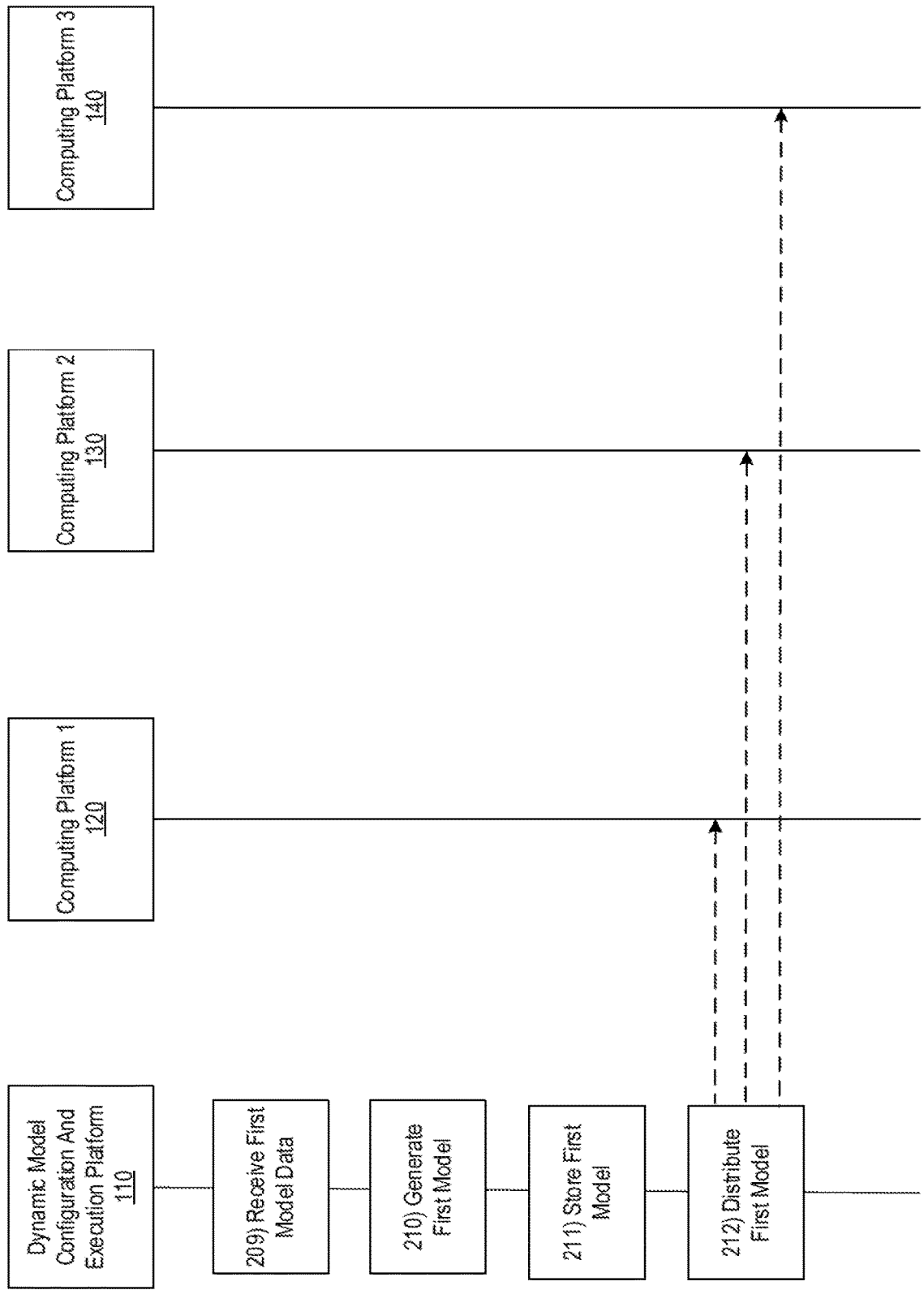

Referring to FIG. 2C, at step 209, dynamic model configuration and execution platform 110 may receive the first model configuration data from computing platform 120. At step 210, dynamic model configuration and execution platform 110 may generate a first model based on the first model configuration data received by dynamic model configuration and execution platform 110 from computing platform 120. As discussed above with reference to FIG. 3A, the model configuration data may include one or more configuration files, such as a model execution configuration data and a model output configuration data. In one example, the first model may be generated based on the model execution configuration data received by dynamic model configuration and execution platform 110 from computing platform 120. The model execution configuration data may comprise configuration data specifying a list of parameters to be used in the model. The model execution configuration data may additionally or alternatively comprise configuration data specifying weights to be assigned to each of those parameters (and/or the process for calculating those weights). The model execution configuration data may additionally or alternatively comprise configuration data (such as one or more equations) specifying how the weighted parameters are to be combined to calculate the output score for the model. Thus, dynamic model configuration and execution platform 110 may generate the first model using any of the configuration data from the model execution configuration data of the first model configuration data received by dynamic model configuration and execution platform 110 from computing platform 130. At step 211, dynamic model configuration and execution platform 110 may store the first model generated by dynamic model configuration and execution platform 110 at step 210. Dynamic model configuration and execution platform 110 may store the first model generated by dynamic model configuration and execution platform 110 at step 210 in storage that is internal to dynamic model configuration and execution platform 110. Alternatively, dynamic model configuration and execution platform 110 may store the first model generated by dynamic model configuration and execution platform 110 at step 210 in storage that is external to dynamic model configuration and execution platform 110. The first model, along with the first model execution configuration data and first model output configuration data may be standardized elements. That is, the first model may be a standardized model that may be executed as-is (that is, without any sort of modification or translation, other than configuration using the first model execution configuration data and/or first model output configuration data) by any of the computing platforms to which the first model is distributed by dynamic model configuration and execution platform 110. Similarly, the first model execution configuration data and the first model output configuration data may be standardized files that may be accessed without modification (such as translation) by any of the computing platforms to which they are distributed by dynamic model configuration and execution platform 110.

At step 212, dynamic model configuration and execution platform 110 may distribute the first model generated by dynamic model configuration and execution platform 110 at step 210 to one or more computing platforms. For example, dynamic model configuration and execution platform 110 may distribute the first model generated by dynamic model configuration and execution platform 110 at step 210 to computing platform 120, computing platform 130, and/or computing platform 140. Although step 212 illustrates dynamic model configuration and execution platform 110 distributing the first model to three different computing platforms, the particular number of computing platforms to which dynamic model configuration and execution platform 110 may distribute the first model may be greater than or less than three (that is, dynamic model configuration and execution platform 110 may distribute the first model to any number of computing platforms). Dynamic model configuration and execution platform 110 may distribute the first model to any number of computing platforms by sending the first model configuration data received by dynamic model configuration and execution platform 110 at step 209 (or a portion thereof) and the model generated by dynamic model configuration and execution platform 110 at step 210. Each of the computing platforms to which dynamic model configuration and execution platform 110 distributes the first model (and first model configuration data, first model execution configuration data, and/or first model output configuration data) may comprise one or more programming platforms for executing models distributed by dynamic model configuration and execution platform 110. The one or more programming platforms may be different types of programming platforms.

The first model and corresponding first model execution configuration data and first model output configuration data that are generated, stored, and distributed by dynamic model configuration and execution platform 110 may be dynamically updated. That is, subsequent to dynamic model configuration and execution platform 110 generating, storing, and distributing the first model, the first model execution configuration data, and the first model output configuration data, dynamic model configuration and execution platform 110 may receive one or more of an updated first model, an updated first model execution configuration data, and/or an updated first model output configuration data. In response, dynamic model configuration and execution platform 110 may update one or more of the stored first model, the stored first model execution configuration data, and/or the stored first model output configuration data to generate an updated first model, an updated first model execution configuration data, and/or an updated first model output configuration data. Dynamic model configuration and execution platform 110 may then store the updated first model, the updated first model execution configuration data, and/or the updated first model output configuration data in storage that is external to dynamic model configuration and execution platform 110 or internal to dynamic model configuration and execution platform 110. Dynamic model configuration and execution platform 110 may additionally distribute the updated first model, the updated first model execution configuration data, and/or the updated first model output configuration data to one or more of computing platform 120, computing platform 130, or computing platform 140.

Figure 2D:
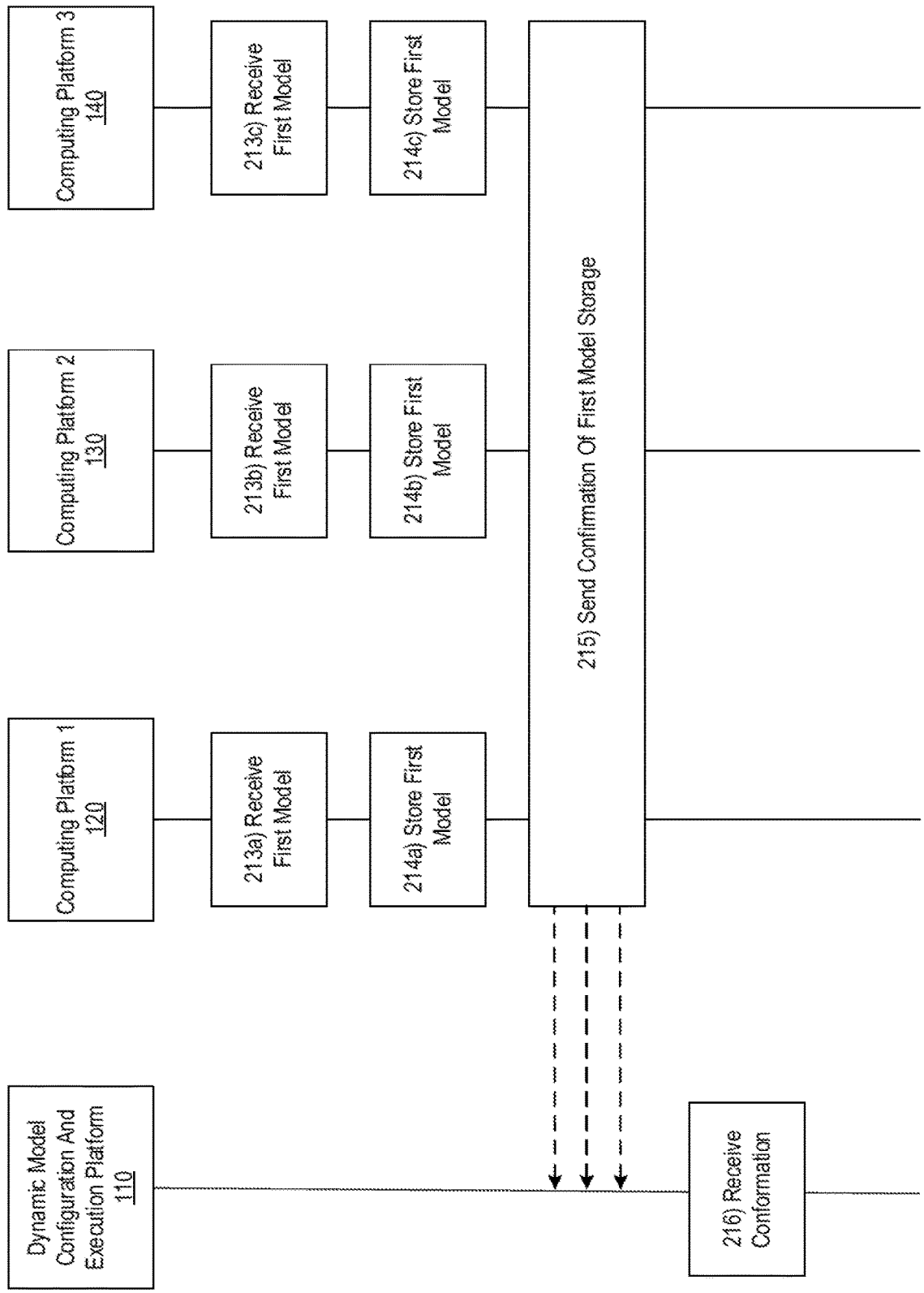

Referring to FIG. 2D, at step 213, the different computing platforms to which dynamic model configuration and execution platform 110 distributed the first model at step 212 may receive the first model. Specifically, at step 213a, computing platform 120 may receive the first model distributed by dynamic model configuration and execution platform 110 at step 212. At step 213b, computing platform 130 may receive the first model distributed by dynamic model configuration and execution platform 110 at step 212. At step 213c, computing platform 140 may receive the first model distributed by dynamic model configuration and execution platform 110 at step 212. As discussed above with reference to step 212, the first model that is distributed by dynamic model configuration and execution platform 110 may include a model generated by dynamic model configuration and execution platform 110 and first model configuration data, which may include model execution configuration data and/or model output configuration data. As further discussed above with reference to step 212, dynamic model configuration and execution platform 110 may distribute the first model to an unlimited number of different computing platforms, each of which may receive the first model at 213. Although steps 213a, 213b, and 213c are illustrated as occurring simultaneously, it is understood that the first model may be received by computing platform 120, computing platform 130, and computing platform 140 at varying times (for example, in response to different distribution times, communication latencies, bandwidth usages on the network, and/or the like).

At step 214, each computing platform to which dynamic model configuration and execution platform 110 distributed the first model at step 212 may store the first model. Specifically, at step 214a, computing platform 120 may store the first model distributed by dynamic model configuration and execution platform 110 at step 212 and received by computing platform 120 at step 213a. At step 214b, computing platform 130 may store the first model distributed by dynamic model configuration and execution platform 110 at step 212 and received by computing platform 130 at step 213b. At step 214c, computing platform 140 may store the first model distributed by dynamic model configuration and execution platform 110 at step 212 and received by computing platform 140 at step 213c. The first model may be stored in storage that is internal and/or external to each computing platform. At step 215, each of computing platform 120, computing platform 130, and computing platform 140 (i.e., each computing platform to which a model is distributed) may send a confirmation to dynamic model configuration and execution platform 110 confirming that that computing platform has stored the first model distributed by dynamic model configuration and execution platform 110 at step 212. At step 216, dynamic model configuration and execution platform 110 may receive the confirmation of storage of the first model from each of computing platform 120, computing platform 130, and computing platform 140 (i.e., each computing platform to which dynamic model configuration and execution platform distributed a model).

Figure 2E:
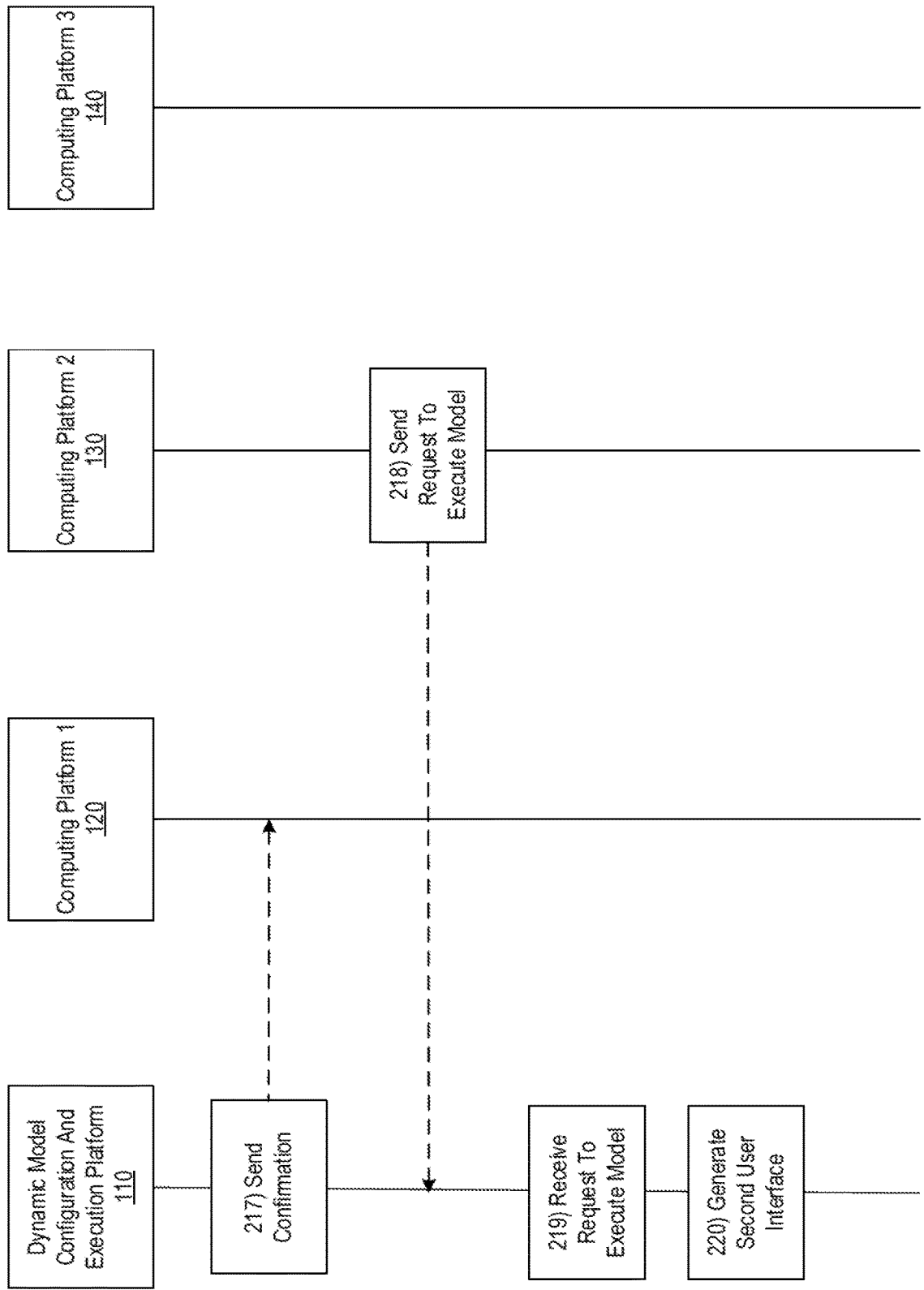

Referring to FIG. 2E, at step 217, dynamic model configuration and execution platform 110 may send a notification to computing platform 120 (i.e., the computing platform from which the request to generate a model was initially received at step 201). The notification may indicate that dynamic model configuration and execution platform 110 generated and stored the first model in response to the request from computing platform 120 at step 201 to generate the first model. Additionally, or alternatively, the notification may indicate the computing platforms to which dynamic model configuration and execution platform 110 distributed the first model. Steps 201-217 may be repeated an unlimited number of times to create an unlimited number of models. Dynamic model configuration and execution platform 110 may generate, store, and distributed models each time a request to create a model is received by dynamic model configuration and execution platform 110 from a computing platform (such as computing platform 120, computing platform 120, and/or computing platform 130). Steps 218-237, discussed below, may be performed in reference to any of these models that are generated, stored, and distributed by dynamic model configuration and execution platform 110.

At step 218, computing platform 130 may send a request to execute a model (or a plurality of models) to dynamic model configuration and execution platform 110. Computing platform 130 may send the request to execute the model(s) to dynamic model configuration and execution platform 110 in response to receiving a user request at computing platform 130 to execute the model(s). At step 219, dynamic model configuration and execution platform 110 may receive the request to execute the model(s) from computing platform 130. In response to receiving the request to execute the model(s) from computing platform 130 at step 219, dynamic model configuration and execution platform 110 may generate, at step 220, a second graphical user interface.

Figure 3B:
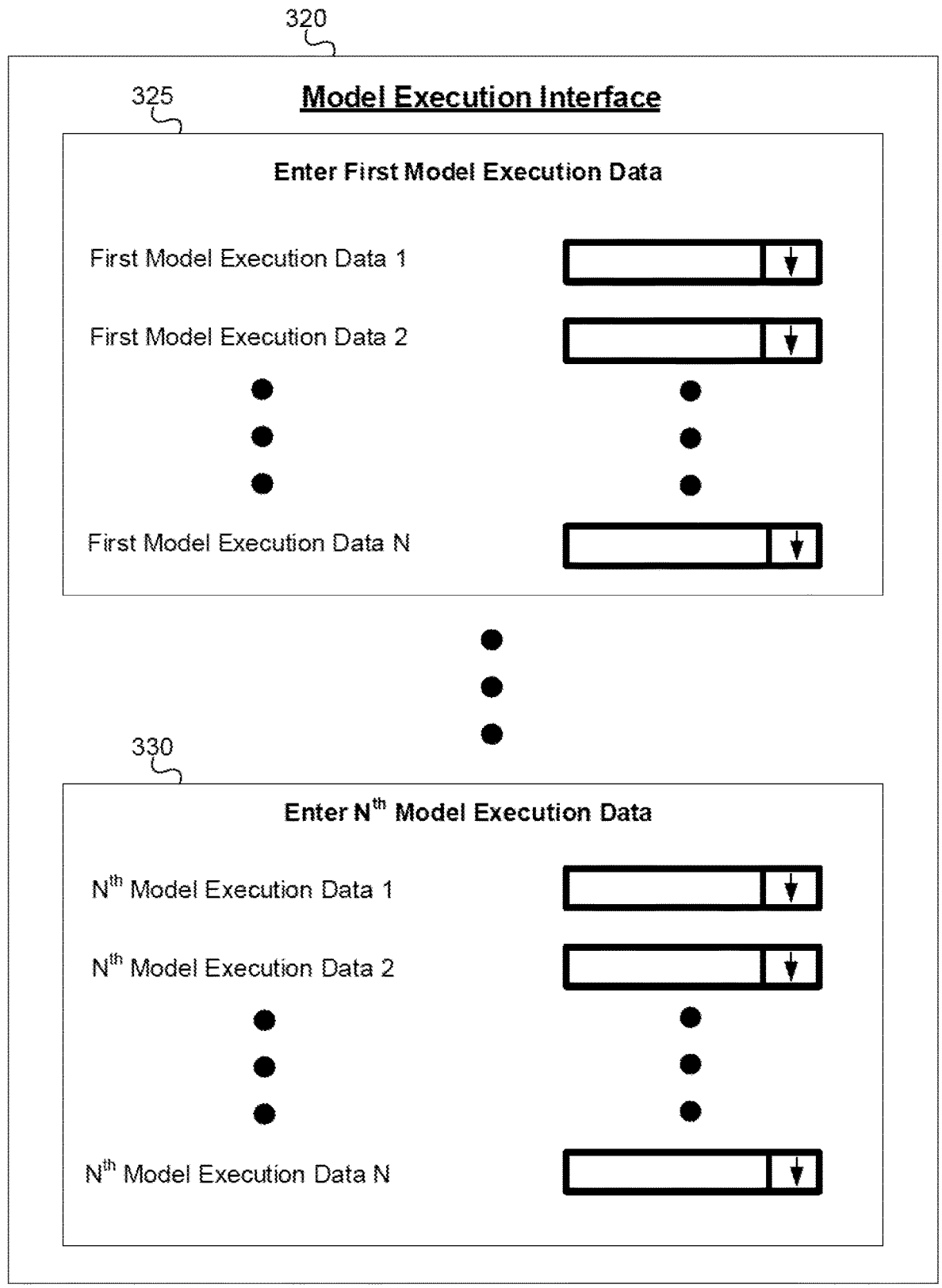

FIG. 3B illustrates an example second graphical user interface 320 that may be generated by dynamic model configuration and execution platform 110 at step 220 and presented to the user in response to dynamic model configuration and execution platform 110 receiving the user request to execute a model (or a plurality of models). The second graphical user interface 320 may include sections 325 and 330. Section 325 of second graphical user interface 320 may include one or more data fields for receiving a first model execution dataset for a first model for which execution is requested by a user. The first model for which execution is requested by a user may be the same as the first model discussed above with reference to steps 201-217 or different than the first model discussed above with reference to steps 201-217.

The first model execution dataset may include first model identification data and first user identification data. The first model identification data may specify a first model to be executed in the form of a model name, model storage location, model identification number, and/or the like. The first user identification may identify a first user for which the first model is to be executed, in the form of a user name, user identification number, and/or the like. Section 325 may include additional data fields to specify additional data related to execution of the first model (for example, an execution mode, a date of execution, a time of execution, and/or the like).

Section 330 of second graphical user interface 320 may include one or more data fields for receiving a $N^{th}$ model execution dataset for a $N^{th}$ model for which execution is requested by a user. The $N^{th}$ model execution dataset may include $N^{th}$ model identification data and $N^{th}$ user identification data. The $N^{th}$ model identification data may specify an $N^{th}$ model to be executed in the form of a model name, model storage location, model identification number, and/or the like. The user identification may identify a $N^{th}$ user for which the $N^{th}$ model is to be executed, in the form of a user name, user identification number, and/or the like. In one example, the first user and the $N^{th}$ user may be different users. In another example, the first user and the $N^{th}$ user may be the same user. Section 325 may include additional data fields to specify additional data related to execution of the $N^{th}$ model (for example, an execution mode, a date of execution, a time of execution, and/or the like).

Additionally, or alternatively, the additional data fields may be used to specify the particular scenario in which the $N^{th}$ model to be executed. For example, the execution of the $N^{th}$ model may be premised on the particular output score resulting from execution of a different model (for example, the first model). Thus, a user may specify an execution workflow of a plurality of models using second graphical user interface 320, in which execution of one or more of those models is premised on the output score generated by execution of a different model. For example, the user may specify, using second graphical user interface 320, that execution of a second model (not shown in second graphical user interface 320) is to performed only if execution of the first model generates an output score that is within a certain range or below/above a particular threshold. In another example, the user may specify, using second graphical user interface 320, that execution of the $N^{th}$ model is to be performed only if execution of the first model generates a first output score that is within a certain range or below/above a particular threshold, and execution of the second model generates a second output score that is within a certain range or below/above a particular threshold. In yet another example, the user may premise execution of the $N^{th}$ model on a particular combination of output scores (that is, execution of the $N^{th}$ model is to be performed only if the combination of the first output score and the second output score is within a certain range or below/above a particular threshold). Though second graphical user interface 320 only illustrates two sections, it is understood that a greater number of sections could be presented, each section associated with the execution of a different model, to facilitate specification of a model workflow for an unlimited number of models.

Referring to FIG. 2F, at step 221, dynamic model configuration and execution platform 110 may send the second graphical user interface 320 generated by dynamic model configuration and execution platform 110 at step 220 to computing platform 130. The sending of the second graphical user interface 320 by dynamic model configuration and execution platform 110 to computing platform 130 may cause and/or be configured to cause computing platform 130 to output the second graphical user interface 320 for display to a user. Specifically, at step 222, computing platform 130 may receive the second graphical user interface 320 from dynamic model configuration and execution platform 110. At step 223, computing platform 130 may output the second graphical user interface 320 received by computing platform 130 from dynamic model configuration and execution platform 110 to a display device of computing platform 130.

Figure 2G:
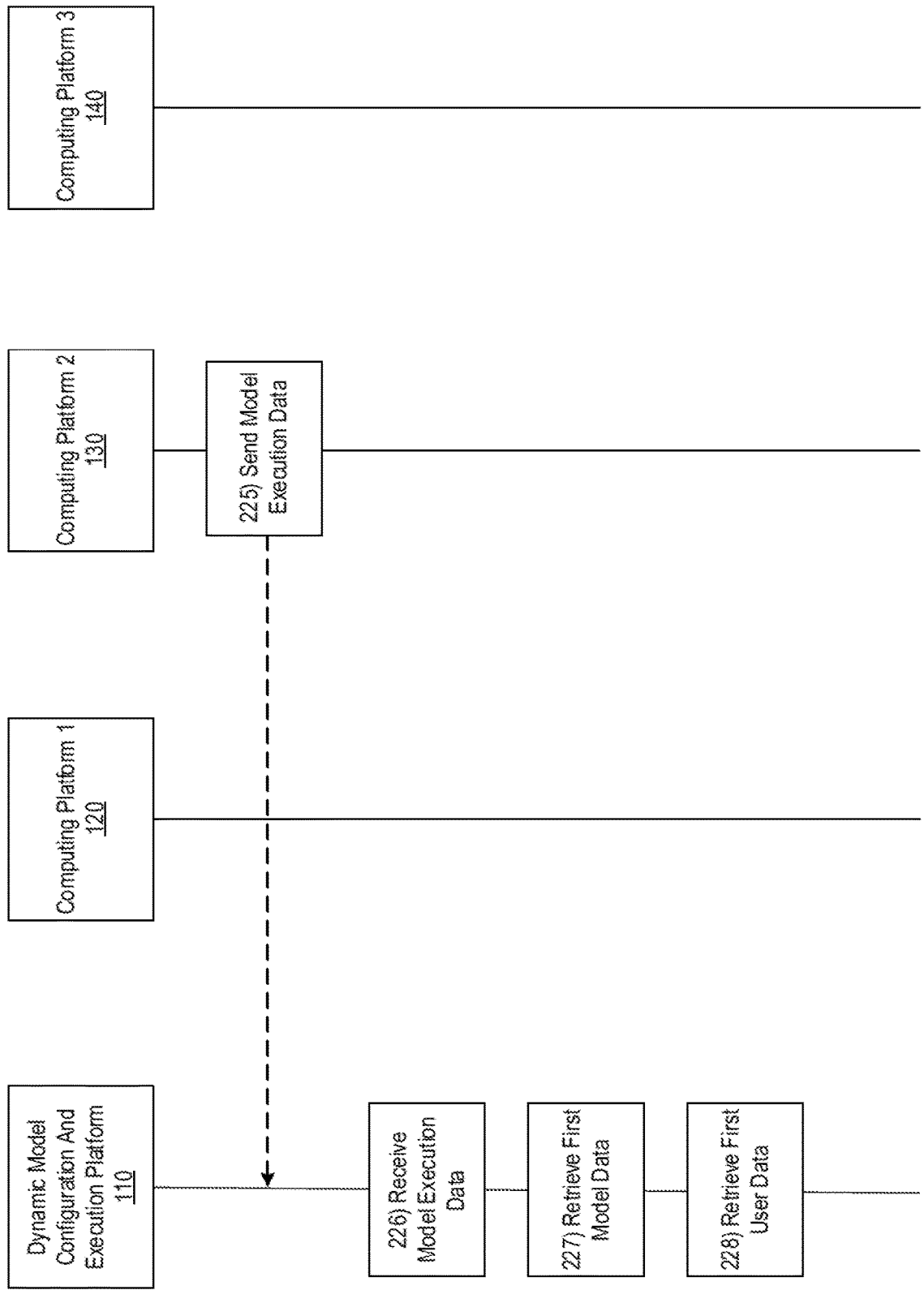

At step 224, in response to outputting the second graphical user interface 320 to the display device, computing platform 130 may receive model execution data via the second graphical user interface 320. As discussed above with reference to FIG. 2F and FIG. 3B, the model execution data may comprise a separate model execution dataset for each model to be executed by dynamic model configuration and execution platform 110. Each model execution dataset may comprise model identification data and user identification data for that model, as discussed above with reference to FIG. 3B. Each model execution dataset may additionally comprise, for any given model that a user is requesting to execute, model execution date/time, and/or specification of execution scenarios for that model. Referring to FIG. 2G, at step 225, computing platform 130 may send the model execution data to dynamic model configuration and execution platform 110. At step 226, dynamic model configuration and execution platform 110 may receive the model execution data from dynamic model configuration and execution platform 110.

Each of the one or more models to be executed by dynamic model configuration and execution platform 110, as identified by a corresponding model execution dataset in the model execution data received by dynamic model configuration and execution platform 110 from computing platform 130, may be a model that was previously generated and stored by dynamic model configuration and execution platform 110 as discussed above with reference to steps 201-217. Thus, each of the one or more models to be executed by dynamic model configuration and execution platform 110 may be stored by dynamic model configuration and execution platform 110 (using storage internal to dynamic model configuration and execution platform 110 or external to dynamic model configuration and execution platform 110) along with corresponding model execution configuration data and model output configuration data.

The discussion below of steps 227-237 pertains to a first model (as identified by a first model execution dataset in the model execution data received by dynamic model configuration and execution platform 110 from computing platform 130) to be executed by dynamic model configuration and execution platform 110. The first model to be executed (that is, the first model discussed below with reference to steps 227-237) may be the same as the first model discussed above with reference to steps 201-217 or different than the first model discussed above with reference to steps 201-217. One or more of steps 227-237 may be repeated for each model to be executed by dynamic model configuration and execution platform 110.

While steps 227-237 are illustrated as being performed by dynamic model configuration and execution platform 110, it is understood that one or more of these steps may be performed by any computing platform to which dynamic model configuration and execution platform 110 distributed its generated models (such as computing platform 120, computing platform 130, and/or computing platform 140).

At step 227, dynamic model configuration and execution platform 110 may retrieve, for the second to be executed by dynamic model configuration and execution platform 110, the first model and first model execution configuration data for the first model. As discussed above with reference to FIG. 2F and FIG. 3B, the model execution data may comprise a separate model execution dataset for each model to be executed by dynamic model configuration and execution platform 110. Each model execution dataset may comprise model identification data and user identification data for that model, as discussed above with reference to FIG. 3B. Each model execution dataset may additionally comprise, for any given model that a user is requesting to execute, model execution date/time, and/or specification of execution scenarios for that model. To retrieve the first model and first model execution configuration data, dynamic model configuration and execution platform 110 may parse the first model execution dataset in the model execution data to extract the model identification data for the first model (which, as discussed above, may be a name of the first model, a storage location for the first model, an identification number of the first model, and/or the like). Dynamic model configuration and execution platform 110 may then retrieve the first model and first model execution configuration data using the model identification in the first model execution dataset.

As discussed above with reference to step 211, dynamic model configuration and execution platform 110 may store the first model (along with the corresponding model execution configuration data and/or model output configuration data) in storage that is internal to dynamic model configuration and execution platform 110 or in storage that is external to dynamic model configuration and execution platform 110. The first model execution configuration data may comprise configuration data specifying a list of parameters to be used in the first model. The first model execution configuration data may additionally or alternatively comprise configuration data specifying weights to be assigned to each of those parameters (and/or the process for calculating those weights). The first model execution configuration data may additionally or alternatively comprise configuration data (such as one or more equations) specifying how the weighted parameters are to be combined to calculate the output score for the first model.

At step 228, dynamic model configuration and execution platform 110 may retrieve first user data for execution of the first model. To retrieve the first user data, dynamic model configuration and execution platform 110 may first retrieve the user identification data from the first model execution dataset. The user identification data may identify a first user for which dynamic model configuration and execution platform 110 is executing the first model. Dynamic model configuration and execution platform 110 may further retrieve the list of parameters to be used in execution of the first model from the first model execution configuration data. Dynamic model configuration and execution platform 110 may then retrieve, for the first user, user-specific values for each parameter specified in the list of parameters to be used in execution of the first model as specified in the first model execution configuration data. The user-specific values may be retrieved from data sources that are internal to the enterprise, data sources that are external to the enterprise, and/or a combination thereof. Dynamic model configuration and execution platform 110 may query these internal/external data sources for the user-specific values for each parameter in the list of parameters in order to retrieve the user-specific values. In response to the queries, dynamic model configuration and execution platform 110 may receive, from these internal/external data sources and for the first user, user-specific values for each parameter specified in the list of parameters to be used in execution of the first model as specified in the first model execution configuration data.

Figure 2H:
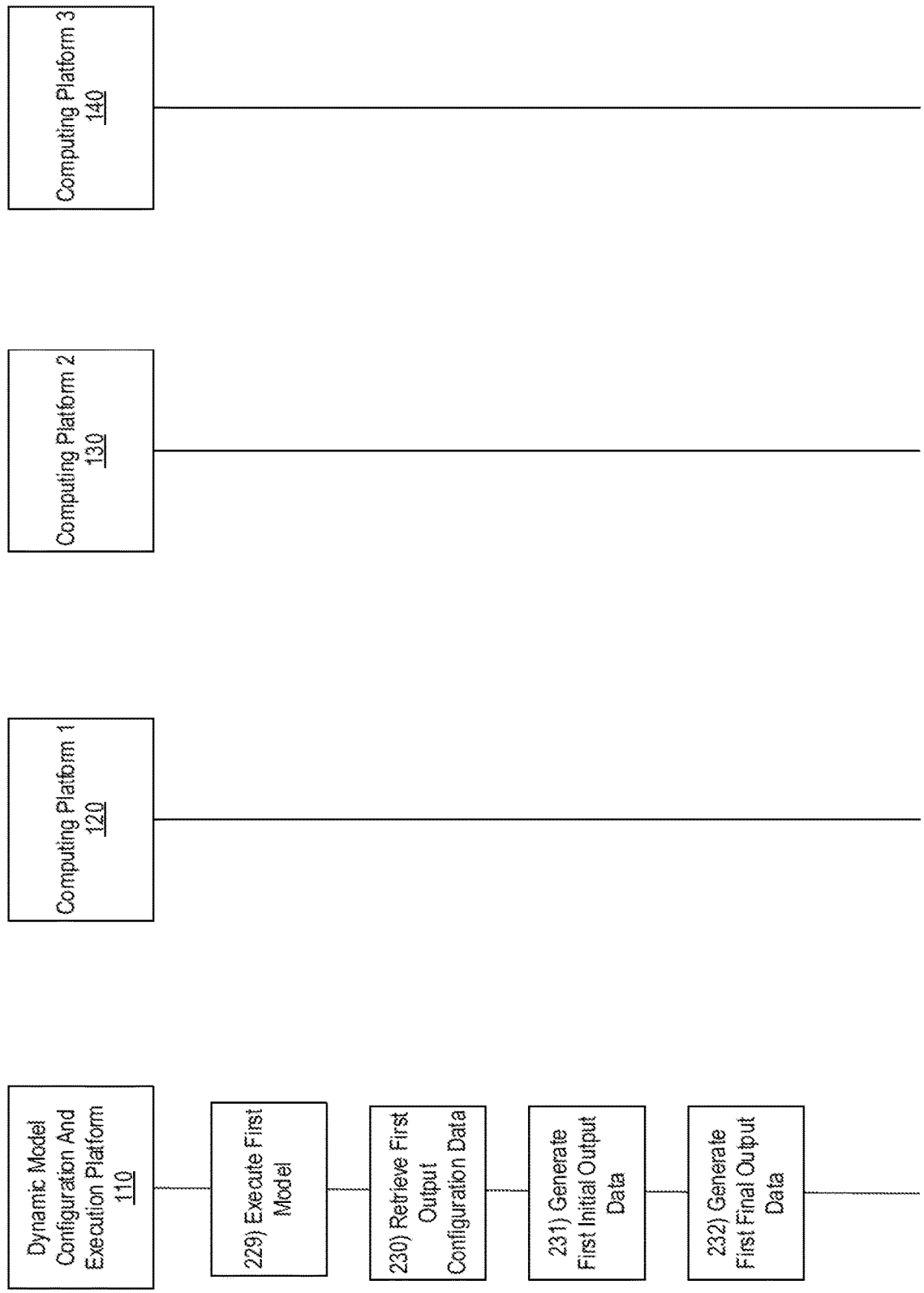
Figure 21:
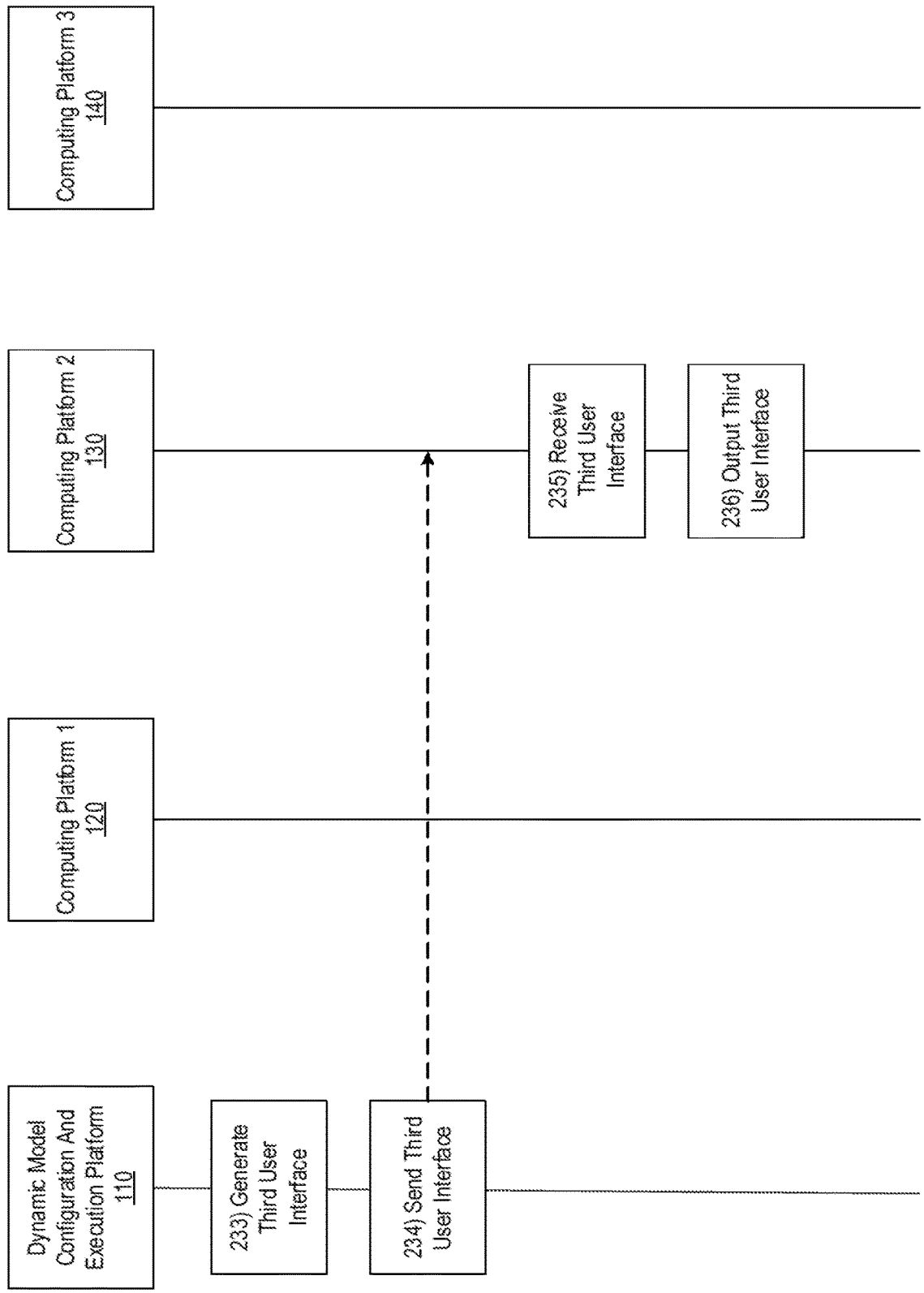

With reference to FIG. 2H, at step 229, dynamic model configuration and execution platform 110 may execute the first model using the first user data (that is, the user-specific values) retrieved at step 228 and the first model execution configuration data retrieved at step 227. As discussed above, the first model execution configuration data may comprise a list of parameters to be used by the first model, configuration data specifying the weights to be assigned to the values of each of those parameters, and configuration data (such as one or more equations) specifying how the weighted parameters are to be combined to calculate the output score for the model. Thus, once dynamic model configuration and execution platform 110 retrieves the user-specific values for each parameter listed in the first model execution configuration data, dynamic model configuration and execution platform 110 may execute the model by assigning weights to each of those user-specific values (based on the configuration data in the first model execution configuration data) and combining those weighted user-specific values using the equations specified in the first model execution configuration data. As a result of executing the first model score, dynamic model configuration and execution platform 110 may generate a first output score.

At step 230, dynamic model configuration and execution platform 110 may retrieve the first model output configuration data associated with the first model. As discussed above, dynamic model configuration and execution platform 110 may have previously stored the first model output configuration data in storage that is external to dynamic model configuration and execution platform 110 or in storage that is internal to dynamic model configuration and execution platform 110. The first model output configuration data may include configuration parameters for generating output data for the user based on the execution of the model, one or more configuration files comprising one or more configuration parameters for generating output data for the user based on the execution of the model, and/or the like. Specifically, the first model output configuration data may comprise one or more rules that specify how one or more parameters are to be used to generate output data for the user. The one or more parameters in the first model output configuration data may comprise the same parameters that are in the first model execution configuration data, a subset of the parameters that are in the first model execution configuration data, different parameters than those in the first model execution configuration data, and/or a combination thereof.

A first set of rules in the first model output configuration data may be used to generate initial output data based on the user-specific values for the parameters retrieved by dynamic model configuration and execution platform 110 at step 228. For example, the rules of the first model output configuration data may specify that if a first user-specific value of a first parameter is within a first range (or above or below a first threshold), the output data is to include first output data. The rules of the first model output configuration data may additionally specify that if a second user-specific value of a second parameter is within a second range (or above or below a second threshold), the output data is to additionally include second output data. The rules of the first model output configuration data may additionally specify that if the first output score from the first model is within a third range (or above or below a third threshold), the output data is to additionally include third output data.

A second set of rules in the first model output configuration data may be directed to generating final output data by modifying the initial output data based on the contents thereof. Continuing with the example above, based on the first type of rules, dynamic model configuration and execution platform 110 may initially generate output data comprising the first output data, the second output data, and the third output data. The second set of rules may specify pruning for the initial data set (for example, in cases where the initial output data includes first output data, second output data, and third output data, the second set of rules may specify that the third output data is to be removed in the final output data), ranking for the initial data set (for example, the order in which the first output data, second output data, and third output data are to be presented to the user), supplementation for the initial data set, modification for the initial data set (for example, in cases where the initial output data includes first output data, second output data, and third output data, the second set of rules may specify that the third output data is to be replaced with fourth output data in the final output data), and/or a combination thereof.

At step 231, dynamic model configuration and execution platform 110 may generate first initial output data based on the first set of rules in the first model output configuration data retrieved by dynamic model configuration and execution platform 110 at step 230, the user-specific values retrieved by dynamic model configuration and execution platform 110 at step 228, and/or the first output score generated by dynamic model configuration and execution platform 110 at step 229. At step 232, dynamic model configuration and execution platform 110 may generate first final output data based on the second set of rules in the first model output configuration data retrieved by dynamic model configuration and execution platform 110 at step 230 and the first initial output data generated by dynamic model configuration and execution platform 110 at step 231.

Figure 3C:
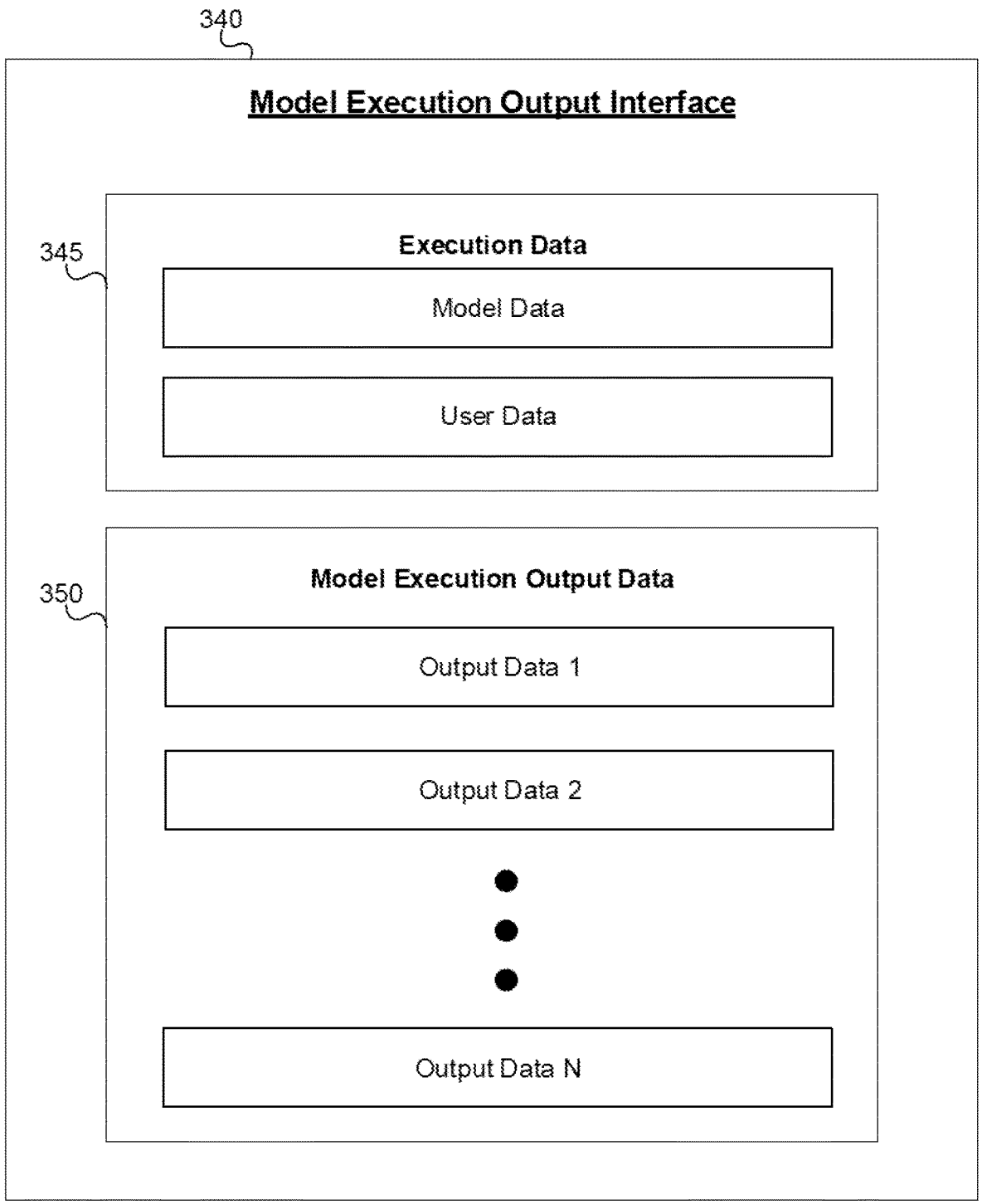

Referring to FIG. 2I, dynamic model configuration and execution platform 110 may generate, at step 233, a third graphical user interface. FIG. 3C illustrates an example third graphical user interface 340 that may be generated by dynamic model configuration and execution platform 110 at step 233 and presented to the user in response to dynamic model configuration and execution platform 110 completing execution of one or more models. The third graphical user interface 340 may include sections 345 and 350. Section 345 of third graphical user interface 340 may include one or more data fields specifying execution data, such as the first model identification data (specifying the first model that was executed in the form of a model name, model storage location, model identification number, and/or the like) and the first user identification data (specifying the first user for which the first model is to be executed, in the form of a user name, user identification number, and/or the like) discussed above with reference to FIG. 3B. Section 350 of third graphical user interface 340 may include one or more data fields comprising the final output data generated by dynamic model configuration and execution platform 110 at step 232. Although only three data fields are shown in section 350, section 350 may include a greater number of data fields or a fewer number of data fields, based on the particular final output data generated by dynamic model configuration and execution platform 110 at step 232.

With further reference to FIG. 2I, at step 234, dynamic model configuration and execution platform 110 may send the third graphical user interface 340 generated by dynamic model configuration and execution platform 110 at step 233 to computing platform 130 (i.e., the computing platform that initially requested execution of the first model). The sending of the third graphical user interface 340 by dynamic model configuration and execution platform 110 to computing platform 130 may cause and/or be configured to cause computing platform 130 to output the third graphical user interface 340 for display to a user. Specifically, at step 235, computing platform 130 may receive the third graphical user interface 340 from dynamic model configuration and execution platform 110. At step 236, computing platform 130 may output the third graphical user interface 340 received by computing platform 130 from dynamic model configuration and execution platform 110 to a display device of computing platform 130.

Referring to FIG. 2J, at step 237, dynamic model configuration and execution platform 110 may store first model audit data for execution of the first model. Dynamic model configuration and execution platform 110 may store the first model audit data in storage that is internal to dynamic model configuration and execution platform 110 or storage that is external to dynamic model configuration and execution platform 110. The first model audit data may comprise any data associated with execution of the first model, such as the first model execution dataset received by dynamic model configuration and execution platform 110 from computing platform 130, the first model retrieved by dynamic model configuration and execution platform 110, the first model execution configuration data retrieved by dynamic model configuration and execution platform 110, the first model output configuration data retrieved by dynamic model configuration and execution platform 110, the first user-specific values retrieved by dynamic model configuration and execution platform 110, the first output score generated as a result of execution of the first model by dynamic model configuration and execution platform 110, the first initial output data generated by dynamic model configuration and execution platform 110, the first final output data generated by dynamic model configuration and execution platform 110, and/or the like.

As discussed above with reference to FIG. 2F and FIG. 3B, the model execution data may comprise a separate model execution dataset for each model to be executed by dynamic model configuration and execution platform 110. The discussion above of steps 227-237 pertains to a first model to be executed by dynamic model configuration and execution platform 110 as indicated by the model execution data. One or more of steps 227-237 may be repeated for each model to be executed by dynamic model configuration and execution platform 110 as indicated by the model execution data. For example, dynamic model configuration and execution platform 110 may determine, subsequent to completing execution of the first model, whether the model execution data received by dynamic model configuration and execution platform 110 from computing platform 130 comprises a second model execution dataset indicating a second model to be executed by dynamic model configuration and execution platform 110. If the model execution data received by dynamic model configuration and execution platform 110 from computing platform 130 comprises a second model execution dataset indicating a second model to be executed by dynamic model configuration and execution platform 110, dynamic model configuration and execution platform 110 may perform one or more of steps 227-237 for the second model. This processing may be repeated by dynamic model configuration and execution platform 110 for each additional model execution dataset in the model execution data received by dynamic model configuration and execution platform 110 from computing platform 130, until dynamic model configuration and execution platform 110 determines that there are no additional model execution datasets to be processed by dynamic model configuration and execution platform 110.

Figure 4A:
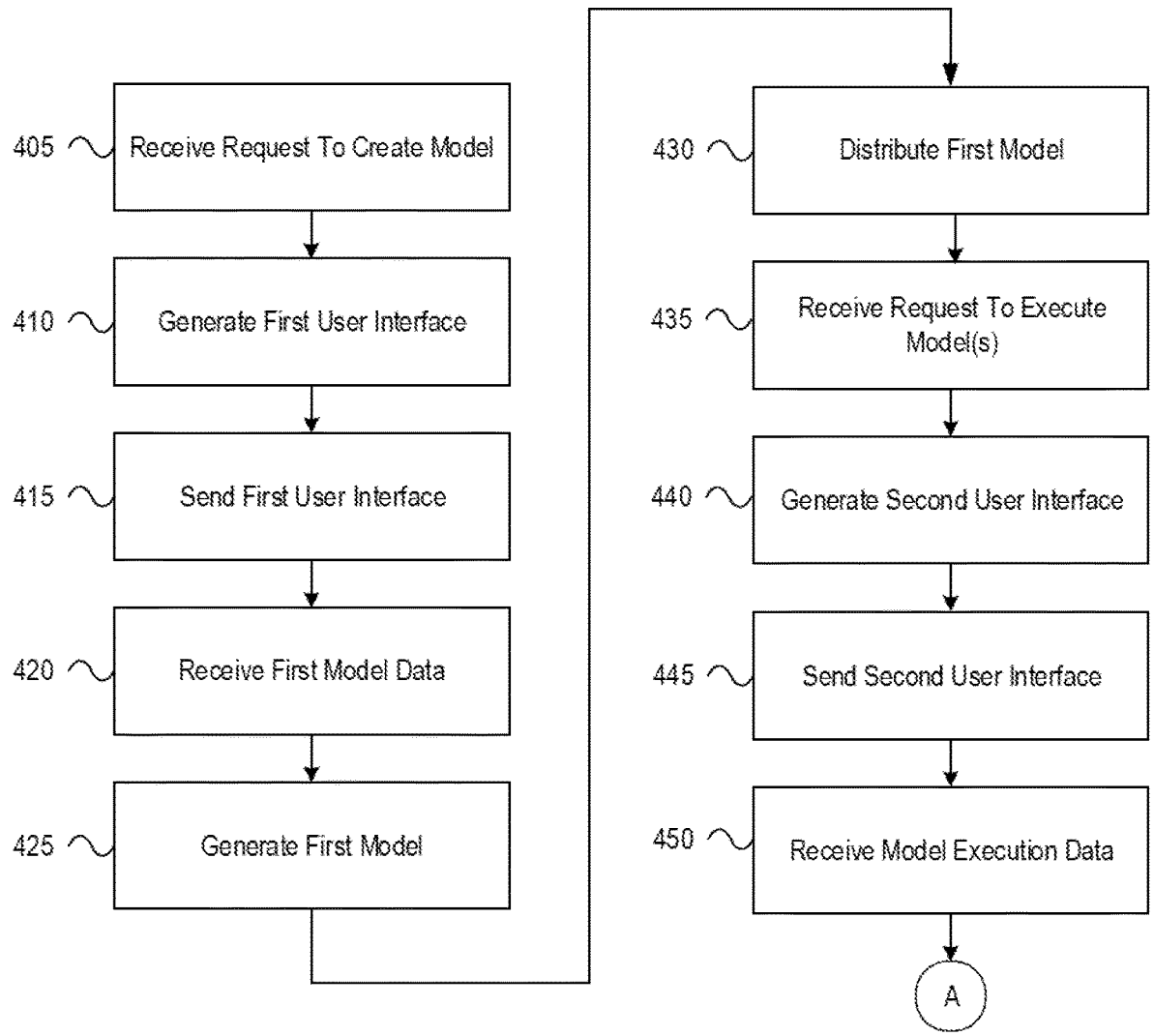
FIGS. 4A-4B depicts an illustrative method for implementing a dynamic model configuration and execution platform in accordance with one or more example embodiments.
Figure 4B:
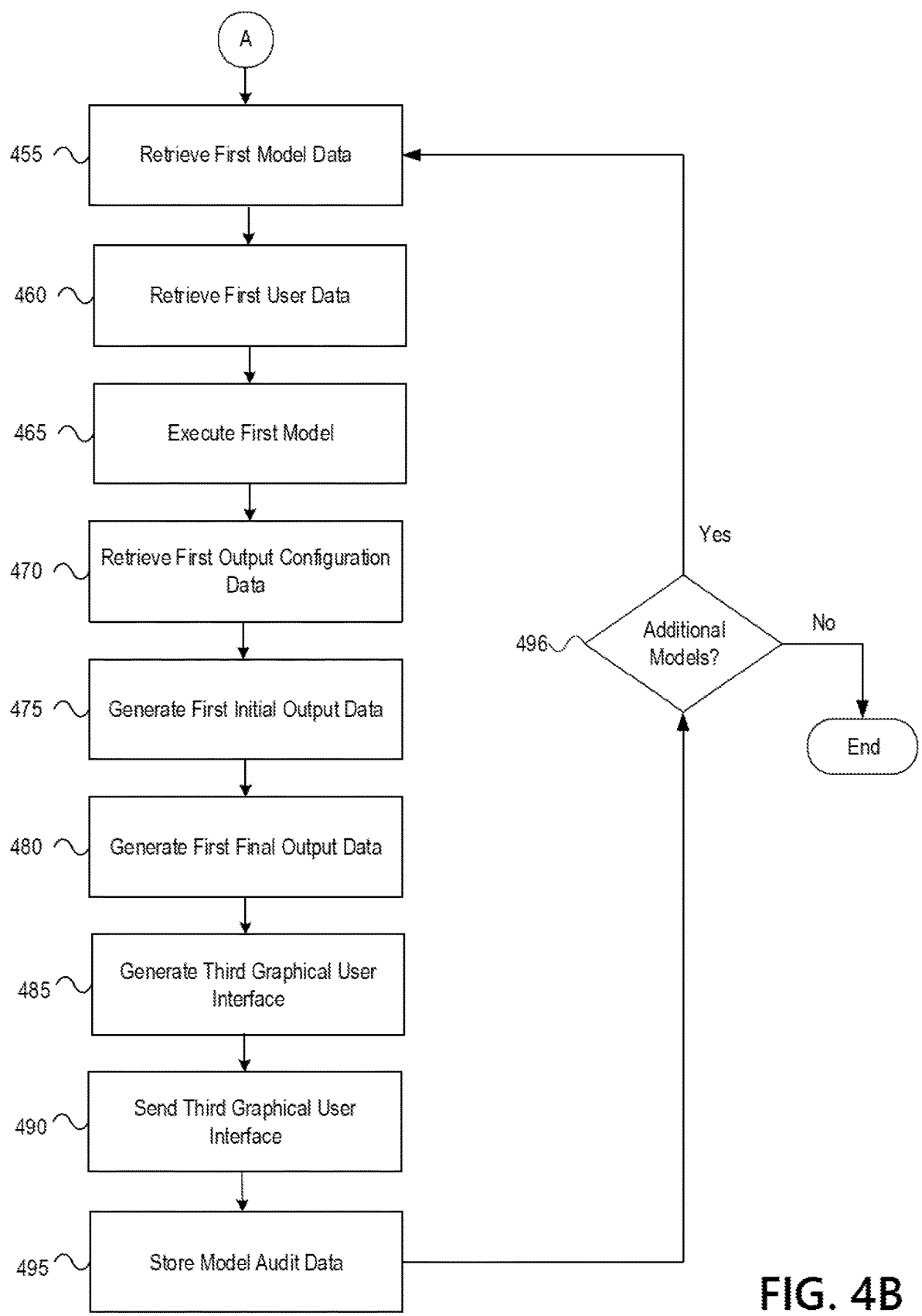

FIGS. 4A-4B depict an illustrative method for implementing a dynamic model configuration and execution platform in accordance with one or more example embodiments Referring to FIG. 4A, at step 405, a dynamic model configuration and execution platform having at least one processor, a communication interface, and memory, may receive a request to create a model from a computing platform. At step 410, the dynamic model configuration and execution platform may generate a first graphical user interface. At step 415, the dynamic model configuration and execution platform may send the first graphical user interface to the computing platform. The sending of the first graphical user interface by the dynamic model configuration and execution platform to the computing platform may cause, or be configured to cause, the computing platform to output the first graphical user interface for display to a display device of the computing platform. At step 420, the dynamic model configuration and execution platform may receive first model data from the computing platform. At step 425, the dynamic model configuration and execution platform may generate a first model based on the first model data. The dynamic model configuration and execution platform may store the first model in internal storage or in external storage, along with configuration data for the first model. At step 430, the dynamic model configuration and execution platform may distribute the first model (and configuration data for the first model) to one or more computing platforms.

At step 435, the dynamic model configuration and execution platform may receive a request to execute one or more models from a second computing platform. At step 440, the dynamic model configuration and execution platform may generate a second graphical user interface. At step 445, the dynamic model configuration and execution platform may send the second graphical user interface to the second computing platform. The sending of the second graphical user interface by the dynamic model configuration and execution platform to the second computing platform may cause, or be configured to cause, the second computing platform to output the second graphical user interface for display to a display device of the second computing platform. At step 450, the dynamic model configuration and execution platform may receive model execution data from the second computing platform. The model execution data may include a separate model execution dataset for each model that a user is requesting to execute. Each model execution dataset may include model identification data and user identification data.

Referring to FIG. 4B, at step 455, the dynamic model configuration and execution platform may retrieve, for a first model execution dataset of the model execution data, first model data. The first model data may comprise a first model and corresponding first model execution configuration data for the first model. At step 460, the dynamic model configuration and execution platform may retrieve first user data for execution of the first model. At step 465, the dynamic model configuration and execution platform may execute the first model using the first model, the first configuration data, and the first user data. The dynamic model configuration and execution platform may generate a first output score as a result of executing the first model. At step 470, the dynamic model configuration and execution platform may retrieve first model output configuration data for the first model. At step 475, the dynamic model configuration and execution platform may generate first initial output data based on the first model output configuration data, the first user data, and/or the first output score. At step 480, the dynamic model configuration and execution platform may generate first final output data based on the first initial output data and the first model output configuration data.

At step 485, the dynamic model configuration and execution platform may generate a third graphical user interface. At step 490, the dynamic model configuration and execution platform may send the third graphical user interface to the second computing platform. The sending of the third computing platform to the second computing platform may cause, or be configured to cause, the second computing platform to output the third graphical user interface for display to the display device of the second computing platform. At step 495, the dynamic model configuration and execution platform may store model audit data in internal or external storage data of the dynamic model configuration and execution platform. At step 496, the dynamic model configuration and execution platform may determine whether the model execution data comprises additional model execution datasets that have not been processed by the dynamic model configuration and execution platform. If the dynamic model configuration and execution platform determines at step 496 that the model execution data comprises additional model execution datasets that have not been processed by the dynamic model configuration and execution platform, processing may return to step 455, and one or more of steps 455-495 may be repeated for the next model execution dataset in the model execution data. If the dynamic model configuration and execution platform determines at step 496 that the model execution data does not comprise additional model execution datasets that have not been processed by the dynamic model configuration and execution platform, processing may end.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
generate, using first model execution configuration data received from a second computing platform via a first graphical user interface, a first model;
distribute, to a plurality of computing platforms, the first model and the first model execution configuration data;
receive, from a third computing platform, a first request to execute one or more models;
generate, in response to receiving the first request to execute the one or more models, a second graphical user interface;
send, to the third computing platform, the second graphical user interface, wherein sending the second graphical user interface to the third computing platform is configured to cause the third computing platform to output the second graphical user interface for display to a display device of the third computing platform;
receive, from the third computing platform, a second request to execute the first model and first model execution data;
execute, in response to receiving the second request to execute the first model from the third computing platform, the first model using the first model execution data received from the third computing platform and the first model execution configuration data received from the second computing platform, wherein executing the first model results in generation of a first model output score that is calculated using at least one weighted parameter;

generate, based on at least the first model output score, initial output data;

generate, based on at least the initial output data, final output data;

generate a third graphical user interface comprising the final output data; and send, to the third computing platform, the third graphical user interface, wherein sending the third graphical user interface to the third computing platform is configured to cause the third computing platform to output the third graphical user interface for display to the display device of the third computing platform.

2. The computing platform of claim 1, wherein generating the first model includes receiving, from the second computing platform and via the first graphical user interface, first model data entered by a user into the first graphical user interface, the first model data comprising first model output configuration data and the first model execution configuration data entered by the user.

3. The computing platform of claim 2, wherein distributing, to the plurality of computing platforms, the first model and the first model execution configuration data includes distributing the first model output configuration data to the plurality of computing platforms.

4. The computing platform of claim 1, wherein generating the first model includes receiving an initial request to generate the first model from the second computing platform.

5. The computing platform of claim 1, wherein executing the first model based on the first model execution data and the first model execution configuration data comprises:

determining that a first model execution dataset of the first model execution data identifies the first model and a first user;

retrieving the first model and the first model execution configuration data; and retrieving user-specific values for the first user for one or more parameters specified in the first model execution configuration data.

6. The computing platform of claim 5, wherein executing the first model based on the first model execution data and the first model execution configuration data further comprises:

weighting each of the user-specific values based on weights specified in the first model execution configuration data.

7. The computing platform of claim 1, the memory storing computer-readable instructions that, when executed by the at least one processor, cause the computing platform to:

determine that a second model execution dataset of the first model execution data identifies a second model;

retrieve the second model and a second model execution configuration data associated with the second model; and execute the second model based on the second model execution configuration data.

8. The computing platform of claim 1, the memory storing computer-readable instructions that, when executed by the at least one processor, cause the computing platform to:

receive an updated model execution configuration data for the first model execution configuration data; and update the first model execution configuration data based on the updated model execution configuration data to generate a first updated model execution configuration data.

9. The computing platform of claim 8, the memory storing computer-readable instructions that, when executed by the at least one processor, cause the computing platform to:

distribute the updated first model execution configuration data to the plurality of computing platforms.

10. A method comprising:

at a computing platform comprising at least one processor, a communication interface, and memory:

distributing, to a plurality of computing platforms, a first model, first model execution configuration data, and first model output configuration data that are generating based on first model data received from a second computing platform via a first graphical user interface;

receiving, from a third computing platform, a first request to execute one or more models;

generating, in response to receiving the first request to execute the one or more models, a second graphical user interface;

sending, to the third computing platform, the second graphical user interface, wherein sending the second graphical user interface to the third computing platform is configured to cause the third computing platform to output the second graphical user interface for display to a display device of the third computing platform;

receiving, from the third computing platform, a second request to execute the first model and first model execution data;

executing, in response to receiving the second request to execute the first model from the third computing platform, the first model using the first model execution data received from the third computing platform and the first model execution configuration data received from the second computing platform, wherein executing the first model results in the generation of a first model output score that is calculated using at least one weighted parameter;

generating, based on the first model output configuration data and the first model output score, initial output data;

generating, based on the first model output configuration data and the initial output data, final output data;

generating a third graphical user interface comprising the final output data; and sending, to the third computing platform, the third graphical user interface, wherein sending the third graphical user interface to the third computing platform is configured to cause the third computing platform to output the third graphical user interface for display to the display device of the third computing platform.

11. The method of claim 10, wherein generating the first model includes receiving, from the second computing platform and via the first graphical user interface, first model data entered by a user into the first graphical user interface, the first model data comprising first model execution configuration data entered by the user into the first graphical user interface and the first model output configuration data.

12. The method of claim 11, wherein distributing, to the plurality of computing platforms, the first model and the first model execution configuration data includes distributing the first model output configuration data to the plurality of computing platforms.

13. The method of claim 10, wherein generating the first model occurs upon receiving an initial request to generate the first model from the second computing platform.

14. The method of claim 10, wherein executing the first model based on the first model execution data and the first model execution configuration data comprises:
  determining that a first model execution dataset of the first model execution data identifies the first model and a first user;
  retrieving the first model and the first model execution configuration data; and
  retrieving user-specific values for the first user for one or more parameters listed in the first model execution configuration data.

15. The method of claim 14, wherein executing the first model based on the first model execution data and the first model execution configuration data further comprises:
  weighting each of the user-specific values based on weights specified in the first model execution configuration data.

16. The method of claim 10, further comprising:
  determining that a second model execution dataset of the first model execution data identifies a second model;
  retrieving the second model and a second model execution configuration data associated with the second model; and
  executing the second model based on the second model execution configuration data.

17. The method of claim 10, further comprising:
  receiving an updated model execution configuration data for the first model execution configuration data; and
  updating the first model execution configuration data based on the updated model execution configuration data to generate a first updated model execution configuration data.

18. The method of claim 17, further comprising:
  distributing the updated first model execution configuration data to the plurality of computing platforms.

19. One or more non-transitory computer-readable media storing instructions that, when executed by a computing platform comprising at least one processor, a communication interface, and memory, cause the computing platform to:
  generate, using first model execution configuration data received from a second computing platform via a first graphical user interface, a first model;
  distribute, to a plurality of computing platforms, the first model and the first model execution configuration data;
  generate, in response to receiving a first request to execute the first model from a third computing platform, a second graphical user interface;
  send, to the third computing platform, the second graphical user interface, wherein sending the second graphical user interface to the third computing platform is configured to cause the third computing platform to output the second graphical user interface for display to a display device of the third computing platform;
  receive, from the third computing platform, a second request to execute the first model and first model execution data;
  execute, in response to receiving the second request to execute the first model from the third computing platform, the first model using the first model execution data received from the third computing platform and the first model execution configuration data received from the second computing platform, wherein executing the first model results in generation of a first model output score that is calculated using at least one weighted parameter;
  generate, based on the first model output score, final output data;
  generate a third graphical user interface comprising the final output data; and
  send, to the third computing platform, the third graphical user interface, wherein sending the third graphical user interface to the third computing platform is configured to cause the third computing platform to output the third graphical user interface for display to the display device of the third computing platform.

20. The one or more non-transitory computer-readable media of claim 19, wherein generating the first model includes receiving, from the second computing platform and via the first graphical user interface, first model data entered by a user into the first graphical user interface, the first model data comprising first model output configuration data and the first model execution configuration data entered by the user into the first graphical user interface.

* * * * *